US 6,585,944 B1

(12) United States Patent
Nunan et al.

(10) Patent No.: US 6,585,944 B1
(45) Date of Patent: Jul. 1, 2003

(54) ENHANCEMENT OF THE OSC PROPERTIES OF CE-ZR BASED SOLID SOLUTIONS

(75) Inventors: John Gerard Nunan, Tulsa, OK (US); Anatoly I. Bortun, Tulsa, OK (US)

(73) Assignee: Delphi Technologies, Inc., Troy, MI (US)

(*) Notice: Subject to any disclaimer, the term of this patent is extended or adjusted under 35 U.S.C. 154(b) by 15 days.

(21) Appl. No.: 09/690,208

(22) Filed: Oct. 17, 2000

(51) Int. Cl.[7] .............................................. B01D 53/56
(52) U.S. Cl. ................... 423/239.1; 423/245.1; 423/247; 502/302; 502/304; 502/340; 502/349; 502/355
(58) Field of Search ........................... 423/239.1, 245.1, 423/247; 502/302, 304, 340, 349, 355; 501/102, 103, 126, 152

(56) References Cited

U.S. PATENT DOCUMENTS

| 4,581,343 A | 4/1986 | Blanchard et al. ......... 502/241 |
| 5,075,276 A | * 12/1991 | Ozawa et al. ............... 502/304 |

FOREIGN PATENT DOCUMENTS

| EP | 0 525 677 A1 | 2/1993 | ........... B01D/53/36 |
| EP | 0 525 677 B1 | 12/1995 | ........... B01D/53/56 |
| JP | 62071536 A | 2/1997 | |
| WO | WO 96/21506 | 7/1996 | ............ B01J/23/83 |

OTHER PUBLICATIONS

"Electrical Conduction in Nb2O2–Doped Cerium Dioxide", I.K. Naik and T.Y. Tien, J. Electrochem. Soc.: Electrochemical Science and Technology, Apr. 1979, pp. 562–566.
"Studies of the cerium–metal–oxygen–hydrogen system (metal=Cu, Ni)", C. Lamonier et al., Catalysis Today 50 (1999), pp. 247–259.
"Phase Stability and Physical Properties of Cubic and Tetragonal ZrO2 in the System ZrO2–Y2O3–Ta2O5", Dao–Joon Kim et al., J. Am Ceram. Soc., 74[12] (1991) pp. 3061–3065.
"Partial oxidation of methane to syngas over Ni/MgO, Ni/CaO and Ni/CeO2", S. Tang, J. Lin and K.L. Tan, Catalysis Letters 51 (1998) pp. 169–175.
"Thermal Analysis of Transition Metal and Rare Earth Oxide System–Gas Interactions by a Solid Electrolyte–Based Coulometric", K. Teske et al., Journal of Thermal Analysis, Vo. 49 (1997) p. 1211–1220.
"Nanophase catalytic oxides: I. Synthesis of doped cerium oxides as oxygen storage promotors", Yu Zhang et al., Applied Catalysis B: Environmental 6 (1995), pp. 325–337.
"Effect of cerium on the mobility of oxygen on manganese oxides", S. Imamura et al.; Applied Catalysis A: General 142 (1996), pp. 279–288.
"Catalytic combustion of hydrocarbons with Mn and Cu–doped ceria–zirconia solid solutions", Daniela Terribile et al., Catalysis Today 47 (1999) pp. 133–140.

* cited by examiner

*Primary Examiner*—Stanley S. Silverman
*Assistant Examiner*—Maribel Medina

(57) ABSTRACT

The present invention relates to high oxygen ion conducting/oxygen storage (OIC/OS) capacity materials, a catalyst employing the OIC/OS materials, and a method for converting hydrocarbons, carbon monoxide and nitrogen oxides using the catalyst. The OIC/OS materials have stable cubic crystalline structures such that after aging for greater than about 36 hours at temperatures up to about 1,200° C., greater than about 60–95% of the cerium present is reducible. These materials comprise up to about 95 mole percent (mole %) zirconium, up to about 50 mole % cerium, up to about 20 mole % of a stabilizer such as yttrium, rare earths, and the like; and about 0.01 to about 25 mole % of a base metal selected from the group consisting of iron, copper, cobalt, nickel, silver, manganese, bismuth and mixtures comprising at least one of the foregoing metals.

15 Claims, 14 Drawing Sheets

US 6,585,944 B1

ENHANCEMENT OF THE OSC PROPERTIES OF CE-ZR BASED SOLID SOLUTIONS

TECHNICAL FIELD

The present invention relates to an OIC/OS material, and especially relates to an OIC/OS material having a stable cubic crystal structure.

BACKGROUND OF THE INVENTION

Solid electrolytes based on zirconia ($ZrO_2$), thoria ($ThO_2$) and ceria ($CeO_2$) doped with lower valent ions have been extensively studied. The introduction of lower valent ions, such as rare earths (Y, La, Nd, Dy, etc.) and alkaline earths (Sr, Ca and Mg), results in the formation of oxygen vacancies in order to preserve electrical neutrality. The presence of the oxygen vacancies in turn gives rise to oxygen ionic conductivity at high temperatures (e.g. greater than 800° C.). Typical commercial or potential applications for these solid electrolytes includes their use in solid oxide fuel cells (SOFC) for energy conversion, electrochemical oxygen sensors, oxygen ion pumps, structural ceramics of high toughness, heating elements, electrochemical reactors, steam electrolysis cells, electrochromic materials, magnetohydrodynamic (MHD) generators, hydrogen sensors, catalysts for methanol decomposition, potential hosts for immobilizing nuclear waste, and oxygen storage materials in three-way-conversion (TWC) catalysts.

Stabilized $ZrO_2$ has been studied as the most popular solid electrolyte. In the case of doped $ZrO_2$ both partially and fully stabilized $ZrO_2$ have been used in electrolyte applications. Partially stabilized $ZrO_2$ consists of tetragonal and cubic phases while the fully stabilized form exists in the cubic fluorite structure. Both $CeO_2$ and $ThO_2$ solid electrolytes exist in the cubic crystal structure in both doped and undoped forms. The amount of dopant required to fully stabilize the cubic structure for $ZrO_2$ varies with dopant type. For Ca it is in the range of 12–13 mole %, for $Y_2O_3$ and $Sc_2O_3$ it is greater than 18 mole % Y or Sc and for other rare earths ($Yb_2O_3$, $Dy_2O_3$, $Gd_2O_3$, $Nd_2O_3$ and $Sm_2O_3$) it is in the range of 16–24 mole % of Yb, Dy, Gd, Nd, and Sm.

Fully or partially stabilized $ZrO_2$, as well as other commonly studied solid electrolytes, have a number of drawbacks. In order to achieve sufficiently high conductivity and to minimize electrode polarization the operating temperatures have to be very high, in excess of 800–1,000° C. For solid oxide fuel cells for example, reducing the operating temperatures below 800° C. would result in numerous advantages such as greater flexibility in electrode selection, reduced maintenance costs, reduction in the heat insulating parts needed to maintain the higher temperatures and reductions in carbonaceous deposits (soot) that foul the operation of the fuel cell.

Further, in the automotive industry there is great interest in developing lower temperature and faster response oxygen sensors to control the air to fuel ratio (A/F) in the automotive exhaust. In the case of three-way-conversion (TWC) catalysts solid solutions containing both $ZrO_2$ and $CeO_2$ are used as oxygen storage (OS) materials and are found to be more effective than pure $CeO_2$ both for higher oxygen storage capacity and in having faster response characteristics to A/F transients.

Oxygen storage capacities (OSC) in these applications arises due to the facile nature of $Ce^{4+} \leftrightarrow Ce^{3+}$ oxidation-reduction in typical exhaust gas mixtures. The reduction of the $CeO_2$ to $Ce_2O_3$ provides extra oxygen for the oxidation of hydrocarbons (HCs) and CO under fuel rich conditions when not enough oxygen is available in the exhaust gas for complete conversion to carbon dioxide ($CO_2$) and water ($H_2O$). The use of binary $CeO_2/ZrO_2$ and ternary $CeO_2/ZrO_2/M_2O_3$ based materials in such applications have advantages over the use of pure $CeO_2$ containing catalysts. This arises because in pure $CeO_2$ only surface $Ce^{4+}$ ions can be reduced in the exhaust at typical catalyst operating temperatures of 300–600° C. (See FIG. 1). However, in binary $CeO_2/ZrO_2$ or ternary $CeO_2/ZrO_2/M_xO_y$ solid solutions more oxygen is made available through the reduction of bulk $Ce^{4+}$ and the subsequent migration of 'O' to the surface of the solid solution crystallites where it reacts with the HCs and CO as is demonstrated in FIG. 2.

The 'O' migration to the surface of the solid solution crystallites is made possible by the formation of the solid solution and is thus an analogous process to that occurring when these same materials are used as solid solution electrolytes. Thus, a more accurate description of these materials for TWC catalyst applications is to view them as oxygen ion conducting/oxygen storage (OIC/OS) materials. These materials have a much higher oxygen storage capacity compared to pure $CeO_2$, especially after catalyst aging and the formation of large crystallites. Further, the response of these solid solutions to changes in the exhaust gas environment is more rapid compared to pure $CeO_2$ with the result that they operate more effectively in preventing $CO/HC/NO_x$ breakthrough during accelerations and they further provide oxygen at lower temperatures.

Aging of electrolytes is a phenomena usually associated with a decrease in the ionic conductivity at a constant temperature with time. The aging process is a function of composition, operating temperature, time and temperature cycling. The two main causes of aging are: a) ordering of the cation and anion sublattice and b) decomposition of the metastable phases. In single phase cubic systems the major cause of aging is formation and growth of microdomains and disproportionation at high temperatures into different phases. Aging of cubic Y stabilized $ZrO_2$ oxygen ion conducting electrolytes for example can occur through disproportionation into a Y-rich cubic phase and a Y-poor tetragonal phase. Thus, phase stability at high temperatures is an important property of solid solution electrolytes and maintaining phase stability in an optimized cubic or tetragonal phase after high temperature operation or cycling is a highly desirable property.

For TWC catalyst applications the newest OIC/OS materials consist of a range of $CeO_2/ZrO_2$ solid solutions with lower valent dopants added to increase the number of oxygen vacancies and to increase the thermal stability and oxygen ion conductivity of the solid solutions after sintering at high temperatures. Zr-rich compositions have the advantage in that the reduction energies for $Ce^{4+} \rightarrow Ce^{3+}$ decrease with increasing Zr content and that the activation energies for mobility of 'O' within the lattice decreases. This is demonstrated in FIGS. 3 and 4 (Balducci et al., J. Phys. Chem. B., Vol. 101, No 10, p. 1750, 1997). (Line A is isolated $Ce^{3+}$ and $V_0''$ vacancies; B is $Ce^{3+}$ minus $V_0''$ clusters; and C is $Ce^{3+}$ minus $V_0''$ minus $Ce^{3+}$ clusters.) However, the Zr-rich systems suffer from the disadvantage in that the oxygen storage capacity is decreased due to the lower $CeO_2$ content. Thus, strategies to optimize the availability (OIC) of the OSC function go counter to those that maximize oxygen storage capacity (OSC).

A further disadvantage of the Zr-rich systems is that the stable crystal structure is tetragonal rather than the more desirable cubic structure. The crossover composition between cubic and tetragonal occurs in the range of 35–45 Mole % $ZrO_2$. Compositions having higher $ZrO_2$ content have the tetragonal crystal structure while compositions of lower Zr content are cubic. It has been found that compositions with the cubic crystal structure have more facile redox properties and respond faster to changes in A/F composition. The preferred cubic phase can be fully stabilized by inclusion of Y or other rare earths such as La and Pr in the $ZrCeO_2$ crystal structure.

Loss of the OIC/OS properties as a function of aging for solid solutions used for TWC applications occurs via a number of mechanisms.

These include: a) decomposition of the meta stable phases; b) overall particle or crystallite growth and c) segregation of the OIC/OS function from the precious metals (PMs).

Decomposition of the meta stable phases can cause loss of OIC/OS properties. Essentially, aging of solid solutions with either cubic or tetragonal stabilized structures can result in disproportionation into a composite consisting of more Ce-rich cubic phases and more Zr-rich tetragonal phases. This is true for both intermediate Zr/Ce-content compositions and for the Ce-rich and Zr-rich parent phases. The degree of disproportionation is dependent on both temperature and exhaust gas environment. Typically, aging under reducing conditions results in much greater disproportionation, probably as a result of reduction of $Ce^{4+}$ to $Ce^{3+}$ which results in an expansion of the Ce ionic radius from 0.92 to 1.034 Å with a consequence being destabilization of the crystal structure. For TWC applications the most ideal crystal structure consists of the cubic phase, even for Zr-rich compositions. This phase can be stabilized by the incorporation of rare earths such as Y and to a lesser extent La and Pr into the crystal structure. Larger doping levels of La and Pr are required for full stabilization of the cubic structure as compared to Y.

Similarly, growth of particle or solid solution crystallites results in loss of oxygen storage capacity as Ce ions located in the interior of the large crystallites become inaccessible for redox activity. Further, with increasing Ce-content the fraction of Ce accessibility for reduction decreases for Ce contents above about 20 mole % Ce in the solid solution. This is demonstrated in FIG. 5 from a temperature programmed reduction (TPR) analysis of $CeO_2/ZrO_2$ compositions of varying Ce/Zr content, theoretical (dashed line), and those that were aged at 1150° C. for 36 hours (solid line). The TPR experiment measures the rate of $H_2$ uptake as a function of temperature in a 5% $H_2$/95% Ar mixture. The lower the temperature for $H_2$ consumption ($Ce^{4+}$ reduction) the more facile the oxygen storage function. The oxygen storage capacity can be calculated from the total $H_2$ uptake based on the reaction stoichiometry:

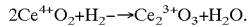
$$2Ce^{4+}O_2+H_2 \rightarrow Ce_2^{3+}O_3+H_2O.$$

It is seen that for low Ce-content mixtures of up to 20 mole %, all the Ce is accessible, i.e. 100% of the Ce present in the solid solution is reduced. However, above 20 mole % addition of more Ce does not result in increased $H_2$ uptake indicating that at the higher Ce-contents the added Ce is not redox active. Thus, improvements in the nature of the OIC/OS material that would increase the fraction of Ce reduction for Ce contents higher than 20 mole % are highly desirable.

Finally, segregation of the precious metals from the OIC/OS materials can cause a loss of OIC/OS properties. A loss of the OIC/OS function occurs as the precious metal and OIC/OS functions in fresh, non-aged catalysts couple to give rise to a synergistic reduction of both the $Ce^{4+}$ and precious metal (c.f. B. Harrison; A. F. Diwell and C. Hallet., Platinum Metals Rev. Vol. 32, P. 73 (1988); H. C. Yao and Y. F. Yu Yao, J. Catal., Vol. 86, P. 254, (1984); J. G. Nunan, H. J. Robota, M. J. Cohn and S. A. Bradley; J. Catal., Vol. 133, P. 309 (1992); J. C. Nunan, SAE Paper 970467, Detroit, (1997)). when the precious metal and the Ce-containing solid solutions are in contact, reduction of both the Ce and precious metal occurs at lower temperatures for both than would happen if both were separate. The catalytic reduction of $Ce^{4+}$ to the $Ce^{3+}$ state by the precious metal is an important and extensively studied aspect of TWC operation. It has been shown that loss of this feature due to sintering and segregation of the precious metal-OIC/OS function results in loss of catalytic activity (c.f. S. H. Oh and C. C. Eickel, J. Catal., Vol. 112, P. 543, (1988); A. S. Sass, V. A. Shvets, G. A. Savel'era, N. M. Povova, and V. B. Kazanskii, Kinet. Katal., Vol. 27, P. 894, (1986); J. G. Nunan, W. B. Williamson and H. J. Robota, SAE Paper 960798, Detroit, (1996); J. G. Nunan, SAE Paper 970467, Detroit, (1997)). For this synergistic reduction feature to operate, both the precious metal and solid solutions have to be in direct contact. Loss of contact between the two components arises due to sintering of the both the precious metals and OIC/OS components. Thus, discovering a method to preserve this synergistic reduction feature after aging is highly desirable.

One way to prevent loss of this synergistic reduction feature would be to incorporate the PM directly into the solid solution matrix or crystal structure. However, this would be extremely costly and potentially wasteful as the PM serves other functions in the TWC catalysts not related to its promrotion of the OIC/OS function.

An alternative approach to prevent loss of the reduction feature would be to introduce a cheaper redox active element into the solid solution matrix that would serve the same function as the PM in promoting $Ce^{4+}$ reduction. Such elements potentially include Fe, Ni, Co, Cu, Ag, Mn, Bi and mixtures of these elements. However, some of these elements are currently used in TWC catalysts for other purposes. Fe, Ni and Mn are used in commercial TWC catalysts for $H_2S$ control and are often impregnated with the oxygen storage function. This is because Ce is the primary source of $H_2S$ emissions (c.f. M. G. Henk, J. J. White and G. W. Denison, SAE paper 872134, Toronto, November, (1987); R. P. Cohn, J. M. Longo, U.S. Pat. No. 4,346,063; G. J. Barnes, J. C. Summers, SAE Paper 750093 (1975); J. S. Rieck, European Patent 0-385-123-A2(1990); G. Blanchard, E. Quemere; O. Touret, V. Visciglio, Eoropean Patent WO 96/21506, (1996)). $H_2S$ emissions arise as during lean (oxidizing conditions) operation the catalyst stores sulfur by formation of Ce, Al and other base metal sulfates. During rich transients (e.g. during an acceleration), these sulfates decompose and the released $SO_2$ is rapidly reduced to $H_2S$ (i.e., the rotten egg odor associated with emission control catalysts) by the precious metals. The $H_2S$ is captured by the Ni, Fe and Mn oxides before it leaves the catalyst and is stored as a sulfide. Regeneration occurs during lean conditions when the sulfide decomposes and the sulfur is released as $SO_2$ and exits the catalyst. It is important to note that in the application of base metal oxides for $H_2S$ control the base metal must exist as a discrete oxide and possess the chemical properties of the oxides for effective operation. Thus, mixtures of the form $(Ce_{0.5}Zr_{0.5}O_2)+(Fe_2O_3)$ could be used as distinct from a true solid solution which have the chemical formula of the type $Ce_aZr_bFe_cO_z$. A summary of the reactions is shown below for Ni:

Rich: $H_2S+NiO \rightarrow NiS+H_2O$

Lean: $NiS+1.5O_2 \rightarrow NiO+SO_2$

In contrast to Ni, Fe, and Mn, Ag is used in TWC catalysts for more effective combustion of aldhehydes for fuels that contain alcohols as octane boosters.

What is needed in the art are OIC/OS materials having stable cubic crystal structures, facile and high oxygen storage and oxygen ion conductivity properties for high Ce-content solid solutions.

SUMMARY OF THE INVENTION

The present invention comprises an OIC/OS material, a catalyst comprising the OIC/OS material, and a method for converting hydrocarbons, carbon monoxide and nitrogen oxides using the catalyst. This OIC/OS material comprises: up to about 95 mole % zirconium, up to about 50 mole % cerium, up to about 20 mole % of a metal selected from the group consisting of yttrium, rare earths (ideally La, Pr or La+Pr) and a mixture of yttrium and a rare earth, and about 0.05 to about 25 mole % of a base metal selected from the group consisting of iron, copper, cobalt, nickel, silver, manganese, bismuth and mixtures comprising at least one of the foregoing metals.

The invention further comprises the reaction product of up to about 95 mole % zirconium, up to about 40 mole % cerium, up to about 15 mole % of a metal selected from the group consisting of yttrium, a rare earth and a mixture of yttrium and a rare earth, and about 0.05 to about 20 mole % of a base metal selected from the group consisting of iron, copper, cobalt, nickel, silver, manganese, bismuth and mixtures comprising at least one of the foregoing metals.

The catalyst comprises the OIC/OS material; a noble metal component; and a high surface area porous support wherein the zirconium, cerium, yttrium, a rare earth (lanthanum or praseodymium), noble metal and porous support are deposited on a substrate. Meanwhile, the method for converting hydrocarbons, carbon monoxide and nitrogen oxides in an exhaust stream, comprising: using the catalyst; exposing the exhaust stream to the catalyst; and converting hydrocarbons, carbon monoxide and nitrogen oxides in the exhaust stream to water, carbon dioxide and nitrogen.

The above described and other features of the present invention will be appreciated and understood by those skilled in the art from the following detailed description, drawings, and appended claims.

BRIEF DESCRIPTION OF THE DRAWINGS

The apparatus and method will now be described by way of example, with reference to the accompanying Figures, which are meant to be exemplary and not limiting.

DESCRIPTION OF THE PREFERRED EMBODIMENT

Figure 1:
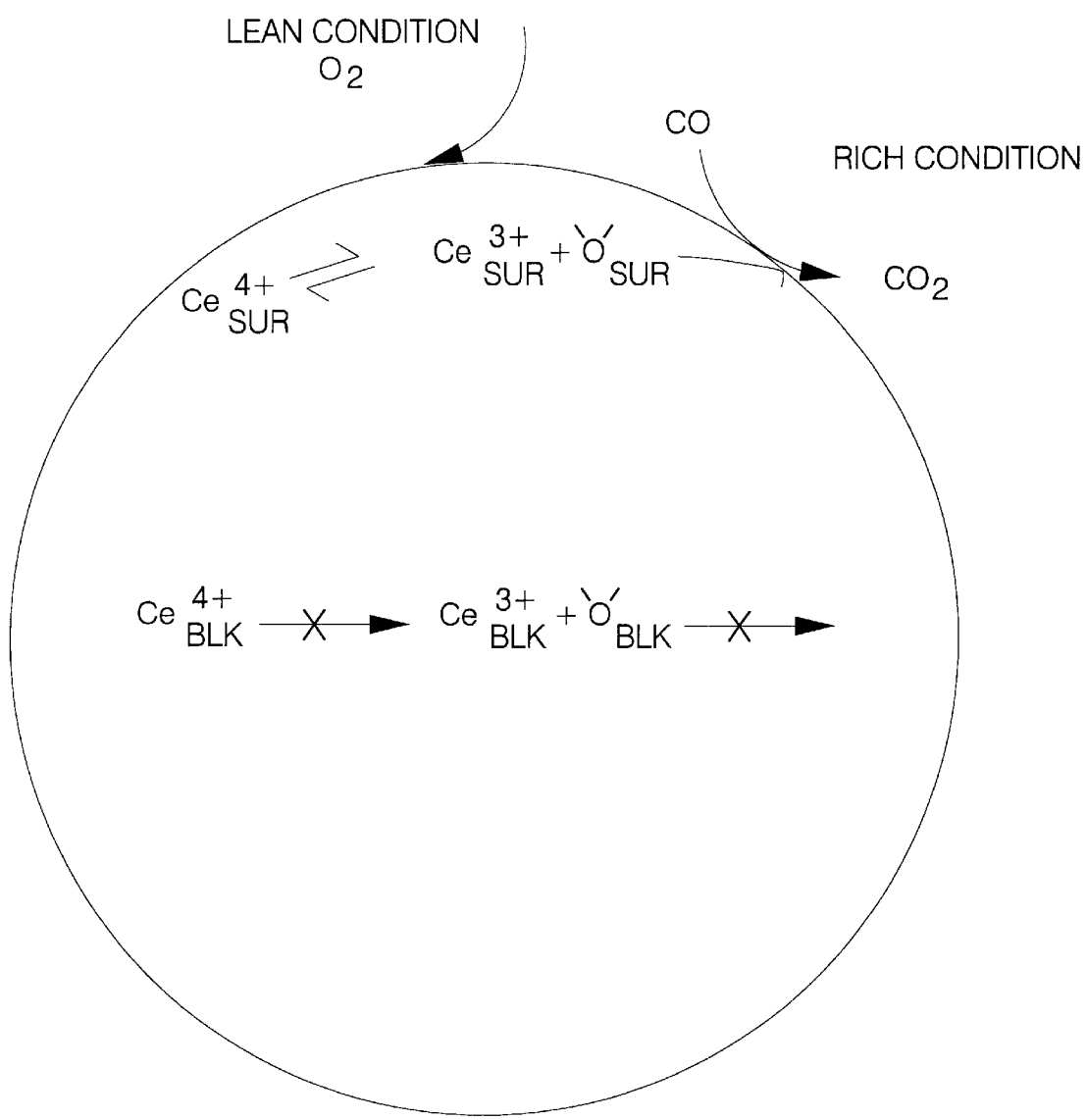
FIGS. 1 and 2 illustrate the fact that when binary or ternary solid solutions are formed between $CeO_2$ and $ZrO_2$, bulk oxygen becomes available for oxidation at the crystal surfaces as a result of bulk $Ce^{4+}$ reduction followed by oxygen migration to the surface of the solid solution crystallites.
Figure 2:
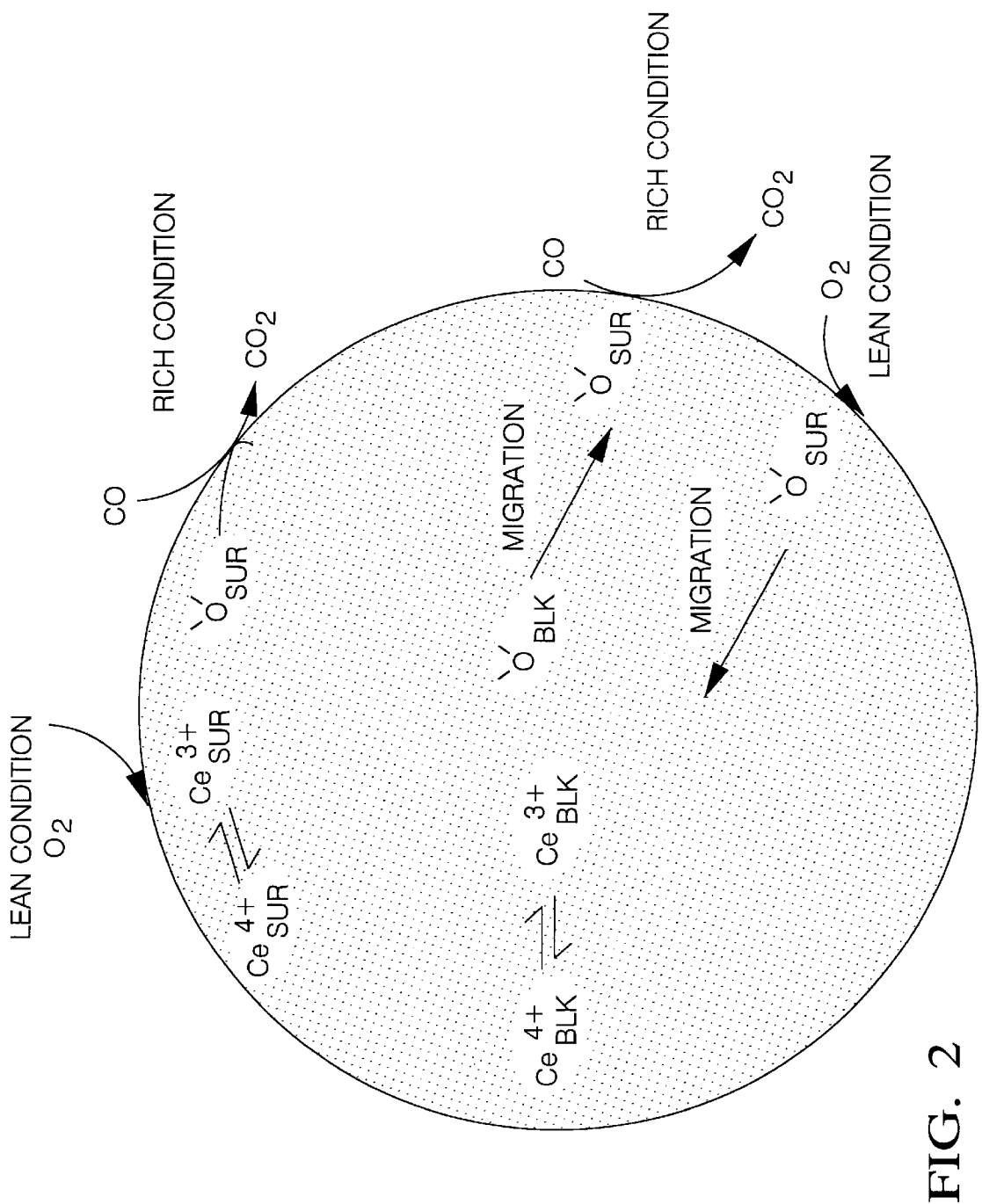
Figure 3:
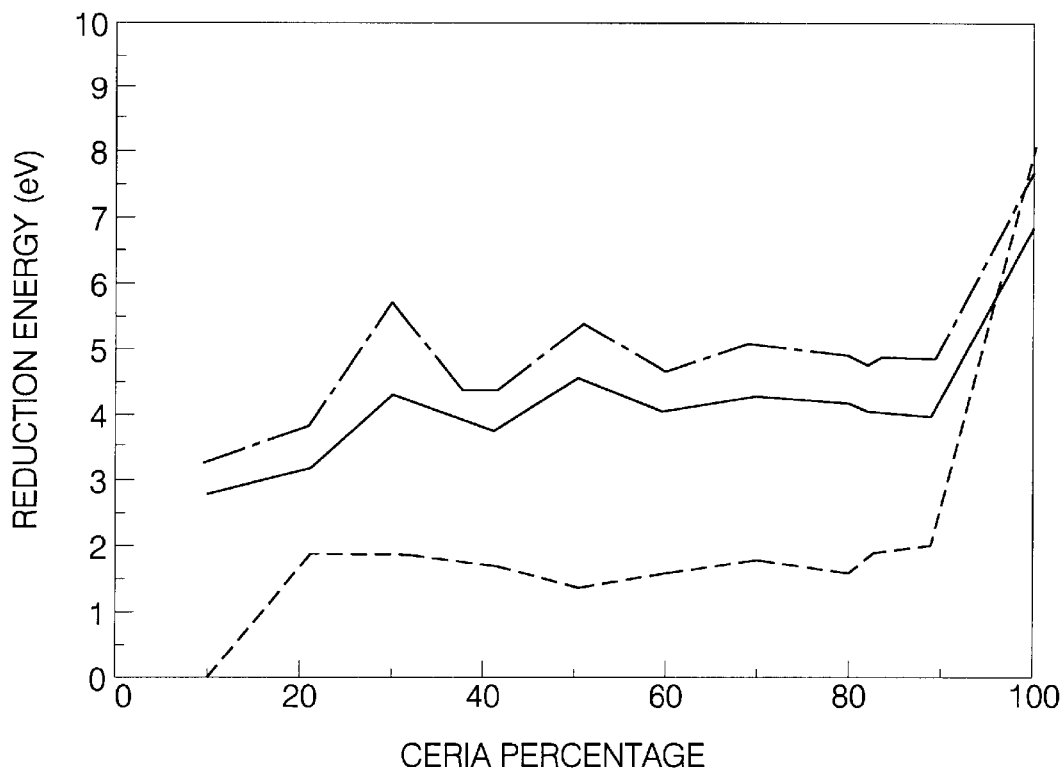
FIGS. 3 and 4 are graphical representations illustrating that Zr-rich compositions possess lower activation energies for 'O' mobility and lower energies of $Ce^{4+}$ reduction.
Figure 4:
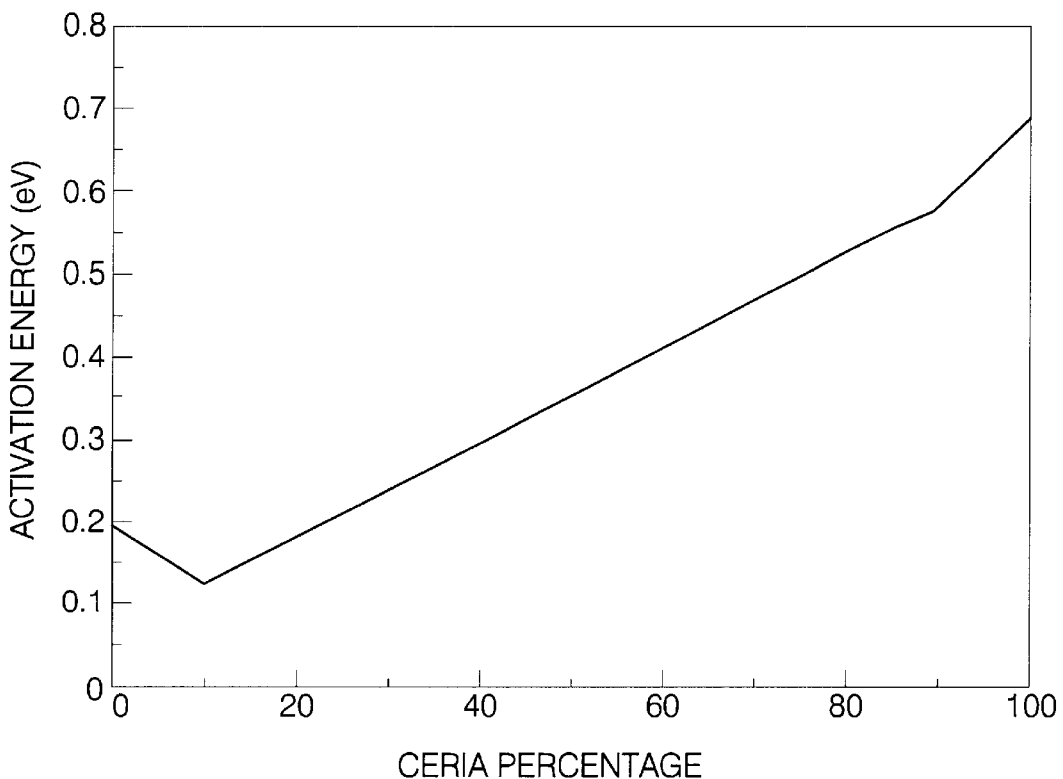
Figure 5:
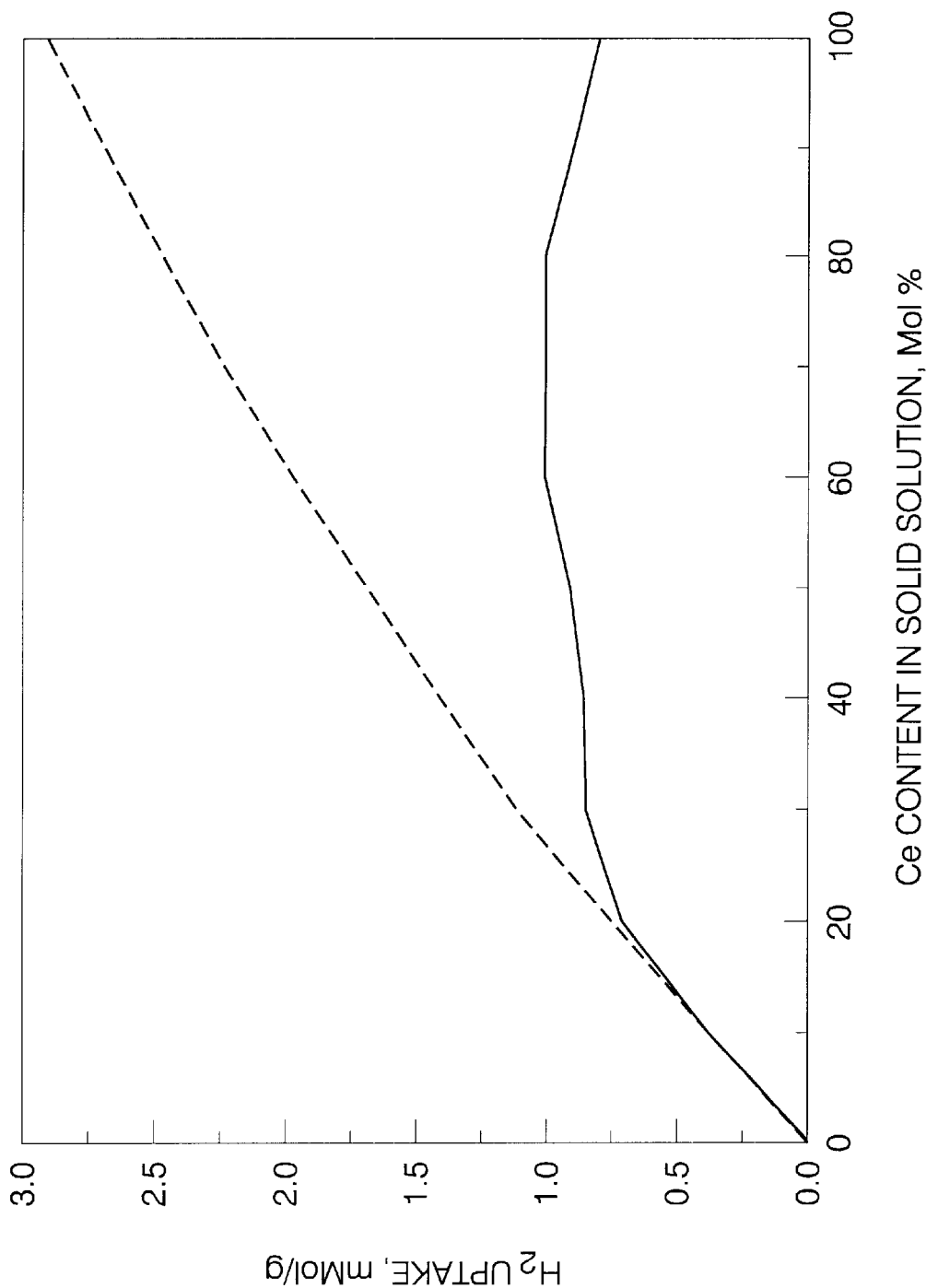
FIG. 5 is a plot of $H_2$ uptake as a function of Ce content for 1150° C. air aged binary $CeO_2/ZrO_2$ solid solutions where the decreased fraction of Ce reduction above 20 mole % Ce content is demonstrated.

The present invention relates to a thermally stable OIC/OS material having a stable cubic structure in which redox active reducible base metals are incorporated into the crystal structure. These base metals may reduce out of the structure under rich (reducing) conditions but reenter the structure under lean (oxidizing) conditions. The OIC/OS material comprises cerium (Ce), zirconium (Zr), a stabilizer (yttrium (Y), optionally other rare earth (La, Pr, Nd, and the like as set forth in the Periodic Table), as well as combinations thereof Y/rare earth (RE) metal(s)), and a redox active base metal. The base metal can be iron (Fe), copper (Cu), cobalt (Co), nickel (Ni), silver (Ag), manganese (Mn), bismuth (Bi), and the like, as well as combinations comprising at least one of these base metals. Suitable base metals preferably have the following properties:

a) Form stable cubic crystal structures with the solid solutions when incorporated into the crystal structure and do not destabilize the cubic crystal structure when exposed to high temperature oxidizing or reducing conditions b) Under reducing conditions they can activate $H_2$ or CO for synergistic reduction of Ce in the solid solution. This can be achieved by the redox active metal as is or after reduction to a lower valent state including the zero valent metallic state.

c) If the zero valent state of the base metal is formed and segregated to the surface of the OIC/OS function occurs, then the base metal should ideally be reversibly incorporated back into the solid solution crystal structure under oxidizing conditions so as to prevent irreversible segregation of the base metal from the Ce-containing OIC/OS function.

d) The base metal should not be irreversibly extracted from the OIC/OS solid solution crystal structure via formation of stable, chemically inert compounds with exhaust gas components such as $H_2O$, $CO_2$ and $SO_2$ to give stable hydroxides, carbonates, hydroxy carbonates and sulfates respectively.

This OIC/OS material is a balance of a sufficient amount of zirconium to preferably minimize the reduction energies of $Ce^{4+}$ and the activation energy for mobility of 'O' within the lattice, a sufficient amount of cerium to provide the desired oxygen storage capacity, sufficient amount of stabilizer (e.g., yttrium, rare earth (La+Pr) or yttrium/rare earth metal) to stabilize the solid solution in the cubic crystalline phase, and a sufficient amount of base metal (Fe, Cu, Co, Ni, Ag, Mn, Bi, and the like, as well as combinations comprising at least one of the foregoing) to enhance both the facile nature and the capacity of the OIC/OS function. The increased facile nature of the OIC/OS function is characterized by the lowering of the reduction temperature of Ce in TPR analysis by 50° C. or more, while the increased capacity is characterized by the increased quantity of $H_2$ uptake (fraction of Ce reduced) measured up to some critical temperature (typically below 700° C.). Typically, this solid solution comprises up to about 95 mole percent (mole %) zirconium, up to about 50 mole % cerium, up to about 20 mole % stabilizer, and about 0.01 to about 25 mole % of the reducible redox active base metal; with up to about 90 mole % zirconium, up to about 40 mole % cerium, and about 2 to about 215 mole % stabilizer, and 0.01 to about 15 mole % of the base metal, preferred; and about 50 to about 85 mole % zirconium, about 10 to about 35 mole % cerium, about 5 to about 15 mole % stabilizer and about 0.01 to about 10 mole % base metal, especially preferred. With respect to the Fe, about 0.01 to about 7 mole % is especially preferred, while for Cu about 0.01 to about 5 mole % is especially preferred.

Conventional three-way conversion catalysts comprising a precious metal such as platinum, palladium, and/or rhodium have initially enhanced oxygen storage capabilities of OIC/OS materials due to a synergistic reduction of cerium and the precious metal. However, once aged, the oxygen storage capability decreases due to sintering of the precious metal(s) and the ceria/zirconia solid solution component, and to their subsequent segregation from each other. In contrast, the present three-way catalyst employs base metal (s) that also induce a synergistic reduction feature for cerium. These base metals are incorporated directly into the solid solution matrix and, since they do not sinter at the operating temperatures, the loss of the synergistic reduction does not occur with aging.

Figure 6:
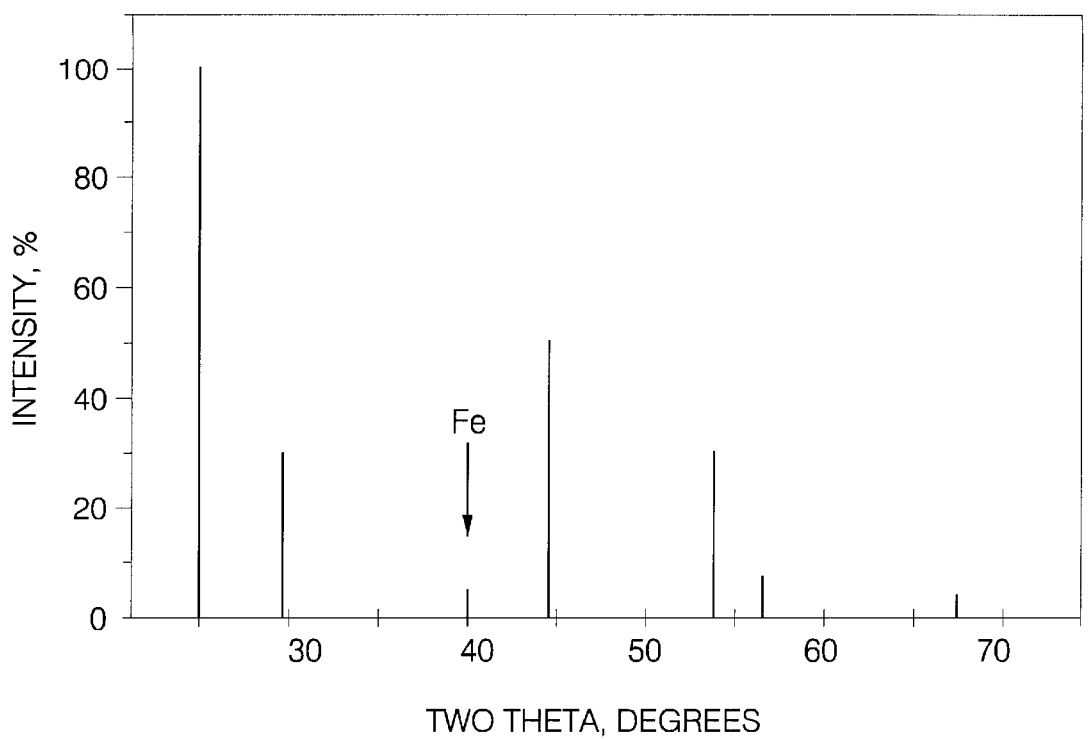
FIG. 6 is an XRD pattern for a quaternary zirconia/ceria/yttria/iron oxide solid solution, comprising $Zr_{0.65}Ce_{0.20}Y_{0.10}Fe_{0.05}O_{1.925}$ after aging at 960° C. for 36 hours in a reducing atmosphere (5% $H_2$/Ar).
Figure 7:
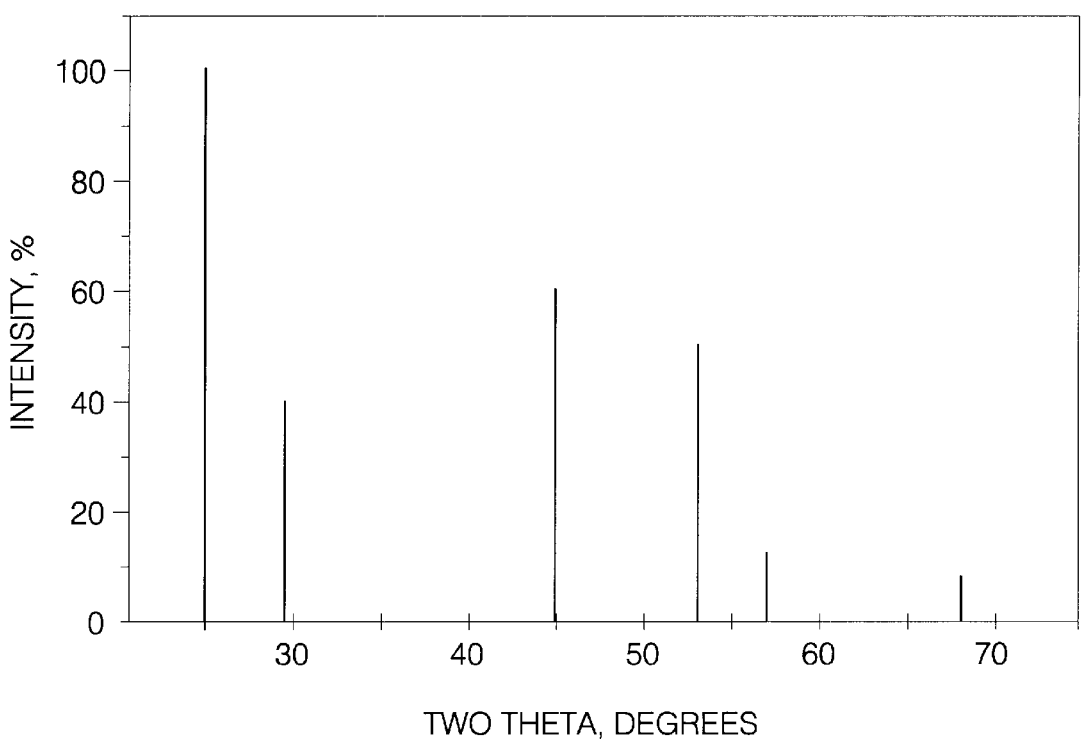
FIG. 7 is an XRD pattern for a quaternary zirconia/ceria/yttria/iron oxide solid solution, comprising $Zr_{0.65}Ce_{0.20}Y_{0.10}Fe_{0.05}O_{1.925}$ after aging at 1,150° C. for 1 hour in an oxidizing atmosphere (air).

These new OIC/OS materials are further characterized by having a cubic crystal structure, particularly a cubic fluorite crystal structure, even for compositions that have in excess of 50 mole % zirconium. The percentage of this OIC/OS material having the cubic structure is greater than about 95%, with greater than about 99% typical, and essentially 100% cubic structure generally obtained (i.e., an immeasurable amount of tetragonal phase based on current measurement technology) even under both oxidizing conditions up to 1,200° C. and reducing conditions up to 1,000° C. After aging in hydrogen, partial reduction of the base metals with the formation of dispersed, catalytically active base metal ions or base metal atoms in the bulk solid or on the solid solution surface. Under oxidizing conditions these reduced base metal atoms are incorporated back into the cubic fluorite structure. This is demonstrated in FIGS. 6 and 7 which provides evidence of reduced $Fe^o$ in the x-ray diffraction (XRD) analysis of a sample reduced at 960° C. in 5% $H_2$/96% Ar. However, after air aging at 1150° C. for 36 hours in air, no evidence of $Fe^o$ or iron oxide is present, indicating that it has re-entered the solid solution matrix. Essentially, after aging for greater than about 36 hours at temperatures up to about 1,200° C. in air, the cerium is reducible at a temperature below about 700° C., and greater than about 60 mole % of the cerium is reducible, with about 70 mole % to about 95 mole % typical, and about 80 mole % to about 95 mole % or greater preferred.

Figure 8:
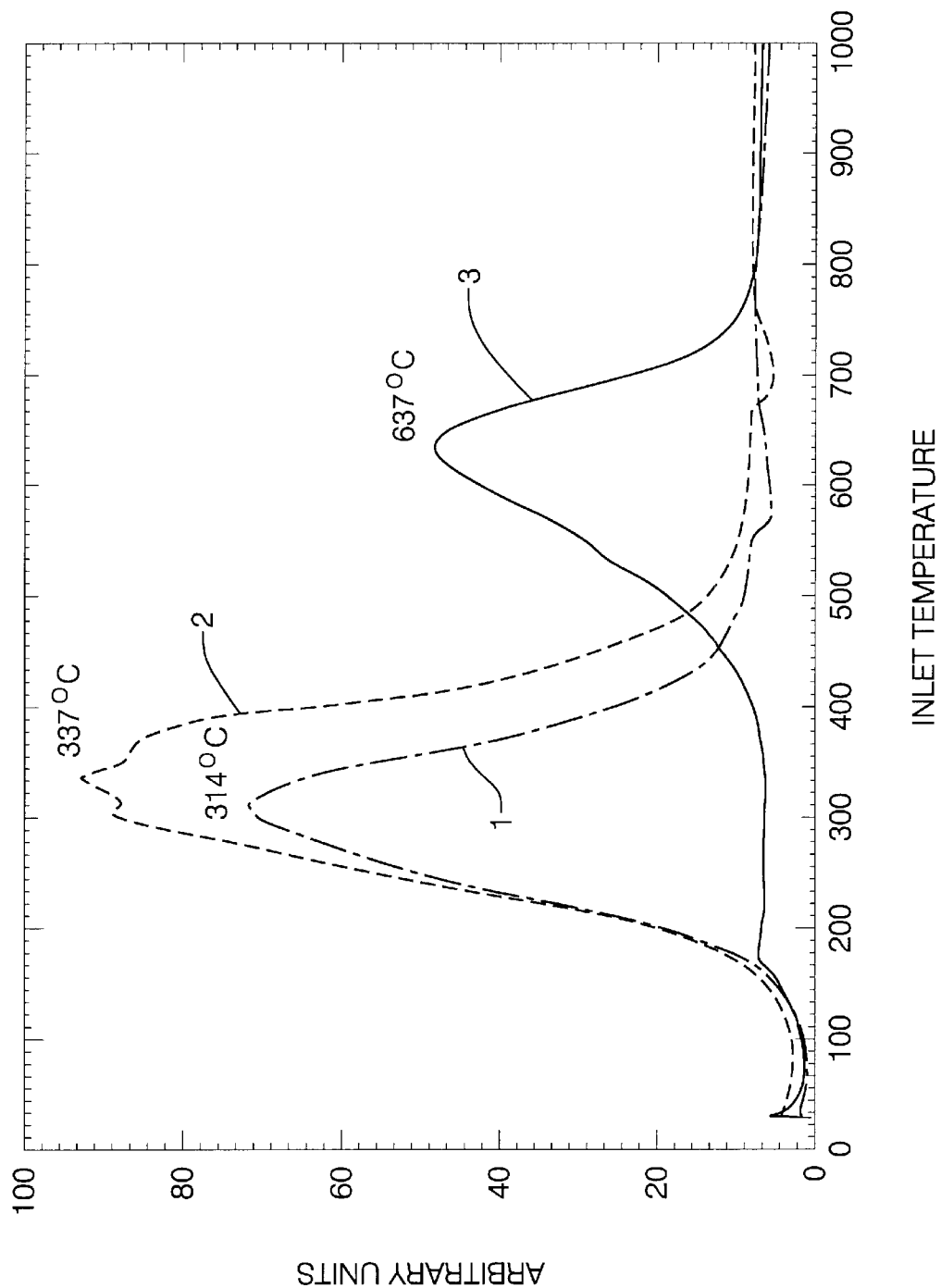
FIG. 8 is a graphical representation of oxygen storage properties for various solid solutions comprising copper versus a zirconia/ceria/lanthanum oxide solid solution after aging at 1,150° C. for 36 hours in air.
Figure 9:
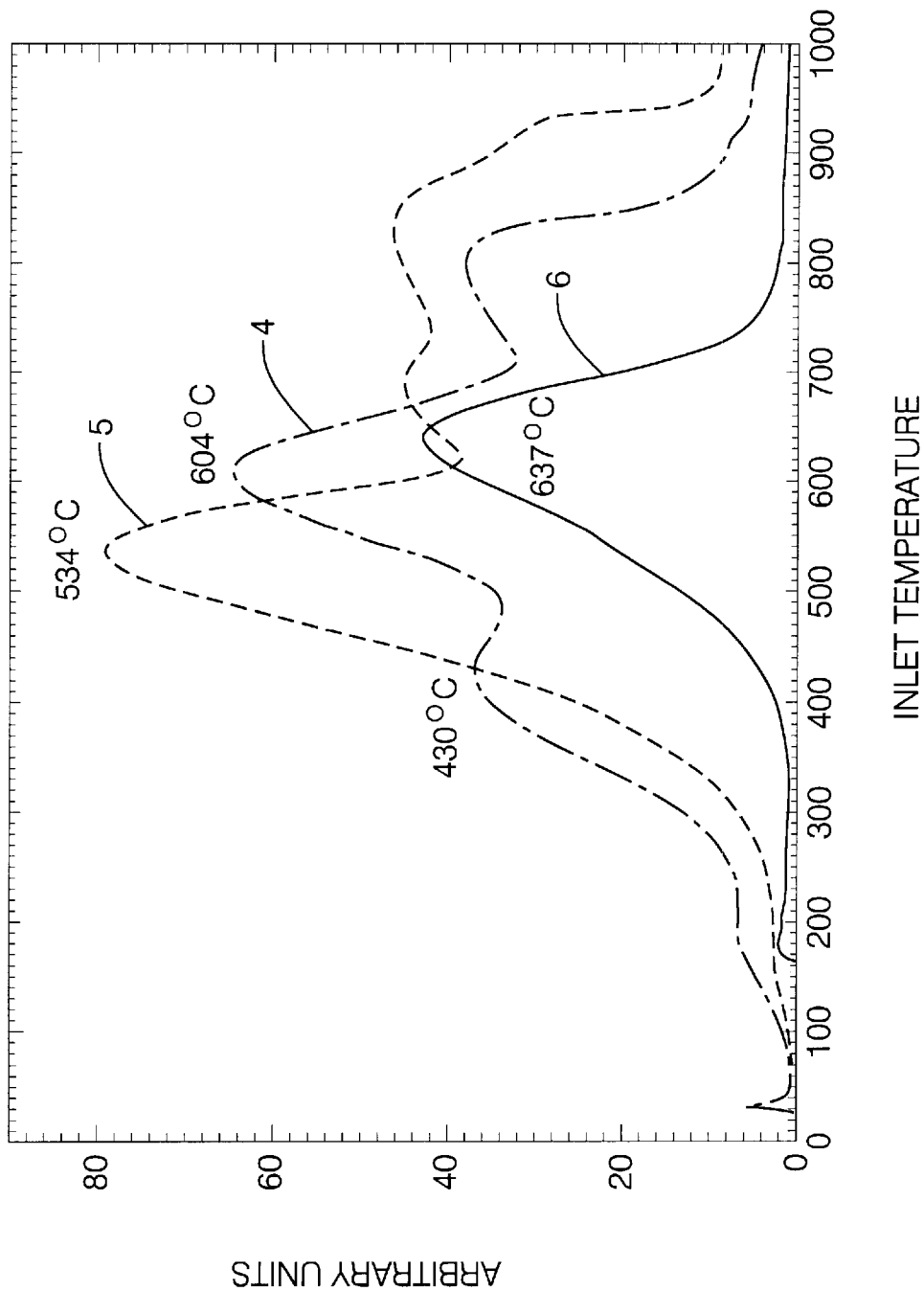
FIG. 9 is a graphical representation of oxygen storage properties for various solid solutions comprising iron versus a zirconia/ceria/lanthanum oxide solid solution after aging at 1,150° C. for 36 hours in air.

The OIC/OS material is further characterized in that it possesses large improvements in durable redox activity with respect to facile oxygen storage and increased capacity. Thus, for Cu containing solid solutions, for example, the reduction of Ce+Cu is observed to occur at a temperature of about 300° C. to about 350° C. lower than would occur in the absence of the Cu dopant. In the case of iron, the Ce+Fe reduction is shifted to lower temperatures by about 50° C. to about 150° C., even after aging at 1,150° C. in air for 36 hours. Referring to FIGS. 8 and 9, enhanced and facile reduction employing iron and copper containing solid solutions is graphically illustrated. In FIG. 8, two embodiments of the present invention, line 1 ($Zr_{0.65}Ce_{0.25}Y_{0.06}Cu_{0.04}O_{1.95}$) and line 2 ($Zr_{0.65}Ce_{0.21}Y_{0.06}Cu_{0.08}O_{1.93}$), were compared to a conventional solid solution, line 3 ($Zr_{0.64}Ce_{0.21}La_{0.15}O_{1.925}$). As can be seen from the graph, the present compositions, lines 1 and 2, decreased the reduction temperature from over 600° C. to below 350° C.

Similarly, in FIG. 9, two embodiments employing iron, line 4 ($Zr_{0.52}Ce_{0.35}Y_{0.08}Fe_{0.05}O_{1.935}$) and line 5 ($Zr_{0.65}Ce_{0.20}Y_{0.05}Fe_{0.10}O_{1.925}$), were compared to a conventional solid solution, line 6 ($Zr_{0.64}Ce_{0.21}La_{0.15}O_{1.925}$). Via the employment of the iron in the solid solution, the reduction temperature of cerium was decreased from over 635° C. to below about 605° C., and even below about 534° C.

Figure 10:
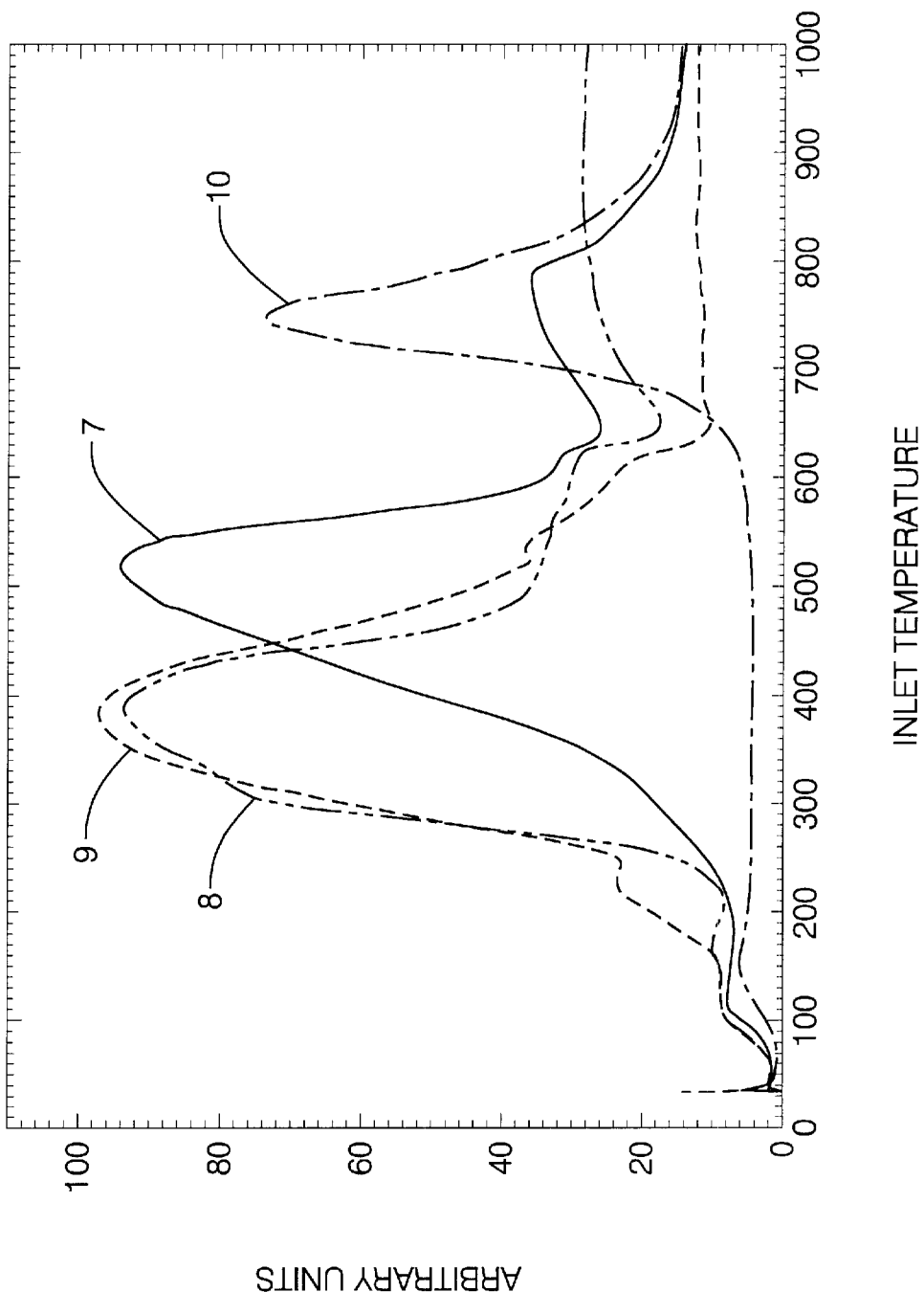
FIG. 10 is graphical representation of oxygen storage properties of solid solutions comprising zirconia, ceria, yttria and different base metals (nickel, copper and iron) included in the solid solution after aging at 1150° C. for 36 hours.

FIG. 10 illustrates further examples of improved OIC/OS characteristics of Fe, Ni and Cu-containing solid solutions where lower reduction temperatures and higher $H_2$ uptake for base metal containing materials is observed as compared to a similar composition but without the base metal present. (Line 7 is $Zr_{0.44}Ce_{0.35}Y_{0.15}Fe_{0.06}O_{2-x}$; line 8 is $Zr_{0.44}Ce_{0.35}Y_{0.15}Ni_{0.06}O_{2-x}$; line 9 is $Zr_{0.50}Ce_{0.35}Y_{0.12}Cu_{0.03}O_{2-x}$; and line 10 is $Zr_{0.75}Ce_{0.25}O_2$.)

Figure 11:
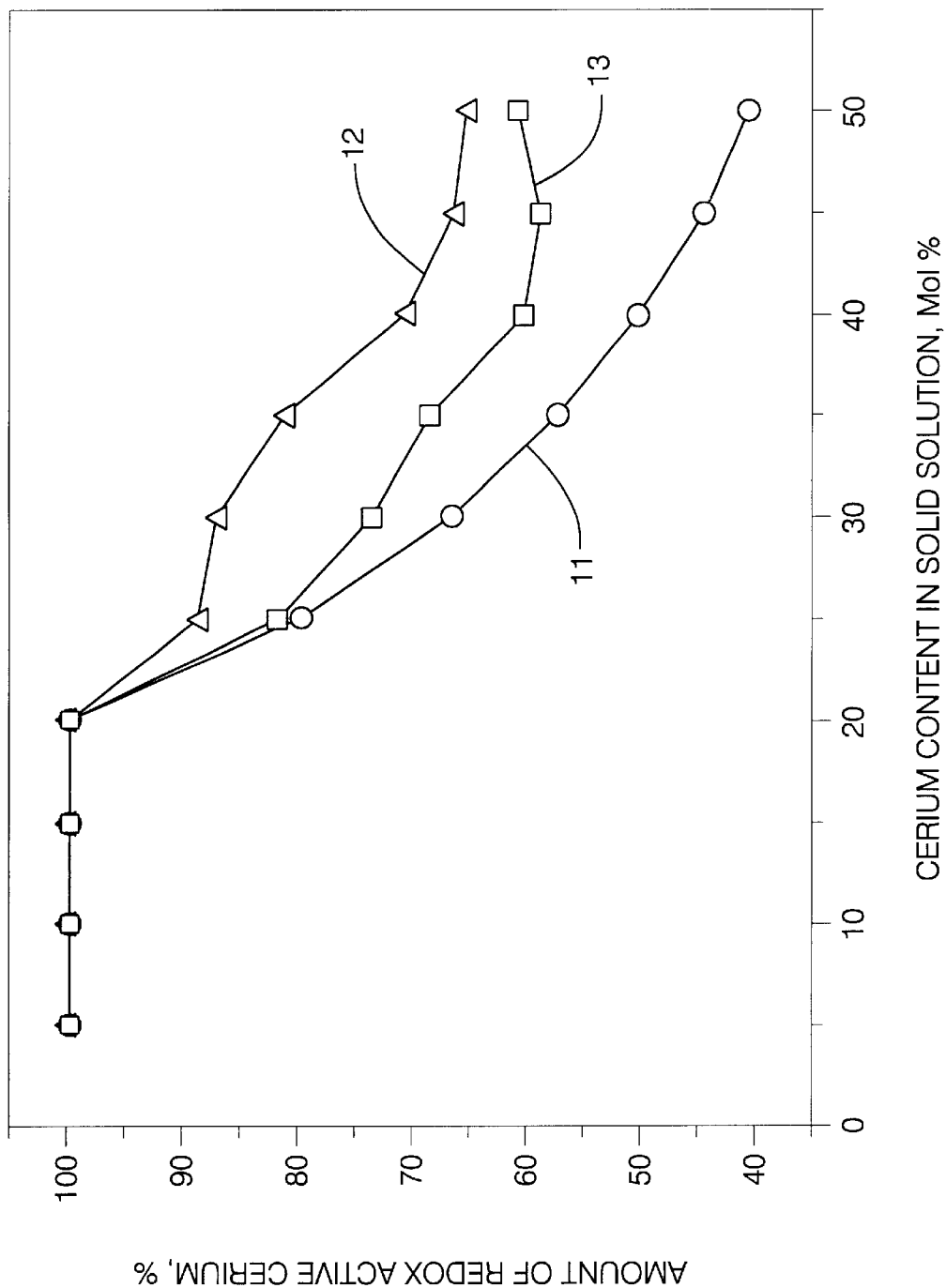
FIG. 11 is a graphical representation of the influence of iron as a dopant on the increased fraction of Ce available for OSC for Ce contents greater than 20 mole % in the solid solution. The samples were aged at 1,150° C. for 36 hours in air before the TPR measurements.
Figure 12:
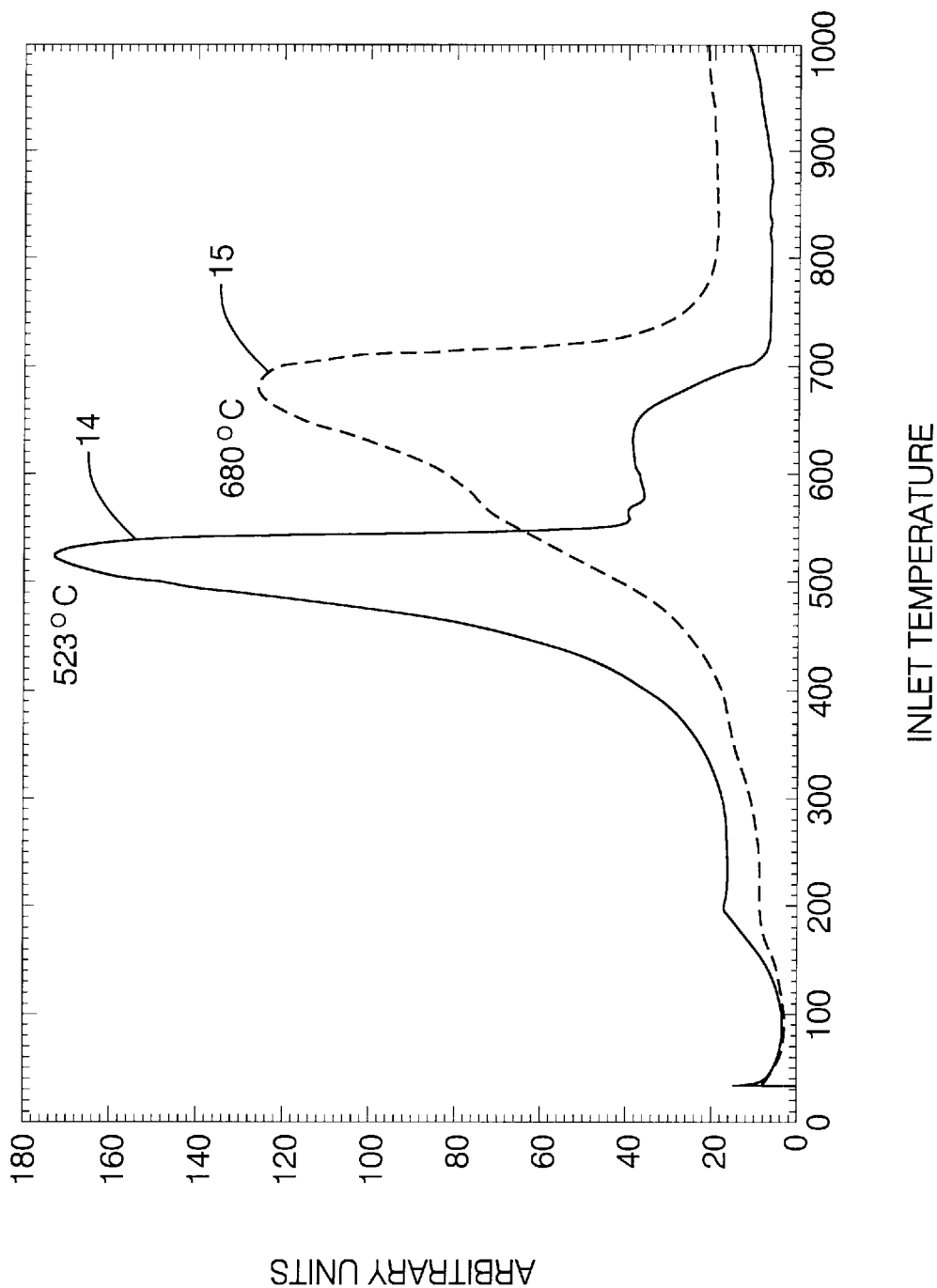
FIG. 12 is a comparison of the OSC characteristics of the solid solutions used in the Pd layer of Test Catalyst A as compared to Reference Catalyst B in Example 26 showing the beneficial effects of Fe doping on the OSC properties. Measurement was done on fresh, non-aged samples.
Figure 13:
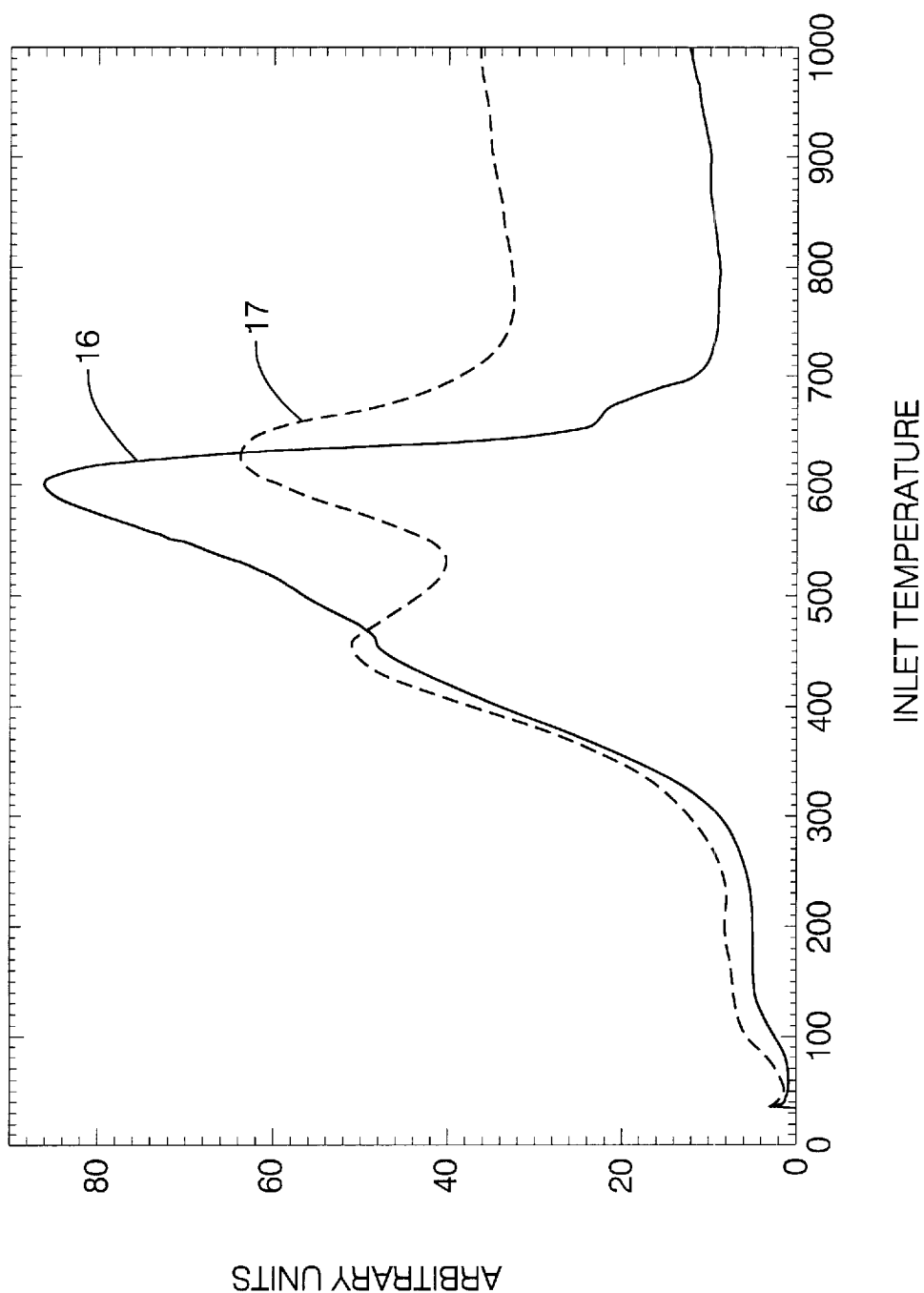
FIG. 13 is a comparison of the OSC characteristics of the solid solution used in the Pd layer of Test Catalyst A as compared to Reference Catalyst B in Example 26 showing the beneficial effects of Fe doping on the OSC properties. Measurement was done on air aged samples at 1,150° C. for 36 hours.

Further, the fraction of Ce reduced (oxygen storage capacity) is greatly increased compared to that for the base metal free samples for Ce contents greater than 20 mole %. This is demonstrated in FIG. 11 for Ce,Zr,Y,FeOx compositions having Fe contents of 4 and 5 mole %, respectively, where line 11 is $Zr_{1-x}Ce_xO_2$; line 12 is $Zr_{0.84-x}Ce_xY_{0.12}Fe_{0.04}O_{2-x}$; and line 13 is $Zr_{0.85-x}Ce_xY_{0.10}Fe_{0.05}O_{2-x}$. It is seen that with increasing Ce-contents a greater fraction of the Ce is reduced in the Fe containing samples as compared to the Fe-free samples. Thus, severe aging at about 1,000° C. to about 1,150° C. in an oxidizing or reducing atmosphere does not deplete oxygen storage capacity characteristics in terms of reduction and oxygen storage capacity (fraction of cerium reduced at low temperature). This is further demonstrated in FIGS. 12 and 13, and in Table 1 below. In FIG. 12, line 14 is 1.34 mMol $H_2$/g of $Zr_{0.52}Ce_{35}La_{0.08}Pr_{0.04}Fe_{0.01}O_{2-x}$ (Test Catalyst A), while line 15 is 1.32 mMol $H_2$/g of $Zr_{0.51}Ce_{37}La_{0.08}Pr_{0.04}O_{2-x}$ (Test Catalyst B). In FIG. 13, line 16 is 1.16 mMol $H_2$/g of Test Catalyst A, while line 17 is 0.74 mMol $H_2$/g of Test Catalyst B. In the Fe-containing solid solution of Test Catalyst A (line 16) 79% of the Ce+Pr is redox active as compared to 53% in the reference solid solution of Reference Catalyst B (line 17).

TABLE 1

Hydrogen TPR Characterization (mMol $H_2$/g)

| Formula | OSC-I $Ce^{IV}/Ce^{III}$ | OSC-II $M^{n-}/M^0$ | TPR OSC | TPR Peak Position* |
|---|---|---|---|---|
| $Zr_{0.50}Ce_{0.35}Y_{0.12}Cu_{0.03}O_{1.91}$ | 1.27 | 0.22 | 1.37 | 382° C. |
| $Zr_{0.44}Ce_{0.35}Y_{0.15}Ni_{0.06}O_{1.865}$ | 1.29 | 0.44 | 1.30 | 387° C. |
| $Zr_{0.44}Ce_{0.35}Y_{0.15}Fe_{0.06}O_{1.895}$ | 1.29 | 0.66 | 1.50 | 518° C. |

The following examples are provided to further illustrate the present invention and not to limit the scope thereof

EXAMPLES

Example 1

Preparation of the $Zr_{0.52}Ce_{0.35}La_{0.08}Pr_{0.04}Fe_{0.01}O_{1.955}$ Solid Solution 150 g of $ZrO(NO_3)_2$ solution (21 wt % Zr), 100.55 g of $Ce(NO_3)_3.6H_2O$, 11.52 g $Pr(NO_3)_3.6H_2O$, 22.93 g $La(NO_3)_3.6H_2O$ and 2.68 g $Fe(NO_3)_3.9H_2O$ were dissolved in 1,000 g of deionized water. The metal containing solution was then slowly added with vigorous stirring to 3 liters (L) of 3 molar (M) $NH_4OH$, which resulted in precipitation of the metals as a mixed hydrous oxide. The reaction mixture was stirred for 3 hours and then the precipitate was filtered and thoroughly washed with deionized water to remove occluded $NH_4NO_3$. The precipitate was transferred to a flat ceramic dish and calcined at 600° C. in air for 2 hours. The calcined powder was wet milled for 30 min. in a vibratory mill and then aged at 1,150° C. for 36 hours in air. XRD showed that the resultant solid solution had a cubic fluorite structure.

Example 2

Preparation of the $Zr_{0.74}Ce_{0.10}Y_{0.12}Fe_{0.04}O_{1.92}$ Solid Solution

The same as for Example 1 using 150 g of $ZrO(NO_3)_2$ solution (21 wt % Zr), 20.15 g $Ce(NO_3)_3.6H_2O$, 21.43 g $Y(NO_3)_3.6H_2O$ and 7.53 g $Fe(NO_3)_3.9H_2O$. XRD analysis showed that the resultant solid solution had a cubic fluorite structure.

Example 3

Preparation of the $Zr_{0.69}Ce_{0.15}Y_{0.12}Fe_{0.04}O_{1.92}$ Solid Solution

The same as for Example 1 using 150 g of $ZrO(NO_3)_2$ solution (21 wt % Zr), 32.48 g $Ce(NO_3)_3.6H_2O$, 22.98 g $Y(NO_3)_3.6H_2O$ and 8.08 g $Fe(NO_3)_3.9H_2O$. XRD analysis showed that the resultant solid solution had a cubic fluorite structure.

Example 4

Preparation of the $Zr_{0.64}Ce_{0.20}Y_{0.12}Fe_{0.04}O_{1.92}$ Solid Solution

The same as for Example 1 using 150 g of $ZrO(NO_3)_2$ solution (21 wt % Zr), 46.68 g $Ce(NO_3)_3.6H_2O$, 24.78 g $Y(NO_3)_3.6H_2O$ and 8.71 g $Fe(NO_3)_3.9H_2O$. XRD analysis showed that the resultant solid solution had a cubic fluorite structure.

Example 5

Preparation of the $Zr_{0.59}Ce_{0.25}Y_{0.12}Fe_{0.04}O_{1.92}$ Solid Solution

The same as for Example 1 using 150 g of $ZrO(NO_3)_2$ solution (21 wt % Zr), 63.30 g $Ce(NO_3)_3.6H_2O$, 26.87 g $Y(NO_3)_3.6H_2O$ and 9.45 g $Fe(NO_3)_3.9H_2O$. XRD analysis showed that the resultant solid solution had a cubic fluorite structure.

Example 6

Preparation of the $Zr_{0.54}Ce_{0.30}Y_{0.12}Fe_{0.04}O_{1.92}$ Solid Solution

The same as for Example 1 using 150 g of $ZrO(NO_3)_2$ solution (21 wt % Zr), 82.99 g $Ce(NO_3)_3.6H_2O$, 29.36 g $Y(NO_3)_3.6H_2O$ and 10.32 g $Fe(NO_3)_3.9H_2O$. XRD analysis showed that the resultant solid solution had a cubic fluorite structure.

Example 7

Preparation of the $Zr_{0.49}Ce_{0.35}Y_{0.12}Fe_{0.04}O_{1.92}$ Solid Solution

The same as for Example 1 using 150 g of $ZrO(O_3)_2$ solution (21 wt % Zr), 106.70 g $Ce(NO_3)_3.6H_2O$, 32.36 g $Y(NO_3)_3.6H_2O$ and 11.38 g $Fe(NO_3)_3.9H_2O$. XRD analysis showed that the resultant solid solution had a cubic fluorite structure.

Example 8

Preparation of the $Zr_{0.44}Ce_{0.40}Y_{0.12}Fe_{0.04}O_{1.92}$ Solid Solution

The same as for Example 1 using 150 g of $Zr O_3)_2$ solution (21 wt % Zr), 135.80 g $Ce(NO_3)_3.6H_2O$, 36.04 g $Y(NO_3)_3.6H_2O$ and 12.67 g $Fe(NO_3)_3.9H_2O$. XRD analysis showed that the resultant solid solution had a cubic fluorite structure.

Example 9

Preparation of the $Zr_{0.39}Ce_{0.45}Y_{0.12}Fe_{0.04}O_{1.92}$ Solid Solution

The same as for Example 1 using 150 g of $ZrO(NO_3)_2$ solution (21 wt % Zr), 172.37 g $Ce(NO_3)_3.6H_2O$, 40.66 g Y(NO$_3$)$_3$.6H$_2$O and 14.30 g Fe(NO$_3$)$_3$.9H$_2$O. XRD analysis showed that the resultant solid solution had a cubic fluorite structure.

Example 10

Preparation of the Zr$_{0.34}$Ce$_{0.50}$Y$_{0.12}$Fe$_{0.04}$O$_{1.92}$ Solid Solution The same as for Example 1 using 150 g of ZrO(NO$_3$)$_2$ solution (21 wt % Zr), 219.68 g Ce(NO$_3$)$_3$.6H$_2$O, 46.64 g Y(NO$_3$)$_3$.6H$_2$O and 16.40 g Fe(NO$_3$)$_3$.9H$_2$O. XRD analysis showed that the resultant solid solution had a cubic fluorite structure.

Example 11

Preparation of the Zr$_{0.75}$Ce$_{0.10}$Y$_{0.10}$Fe$_{0.05}$O$_{1.925}$ Solid Solution The same as for Example 1 using 150 g of ZrO(NO$_3$)$_2$ solution (21 wt % Zr), 19.92 g Ce(NO$_3$)$_3$.6H$_2$O, 17.62 g Y(NO$_3$)$_3$.6H$_2$O and 9.29 g Fe(NO$_3$)$_3$.9H$_2$O. XRD analysis showed that the resultant solid solution had a cubic fluorite structure.

Example 12

Preparation of the Zr$_{0.70}$Ce$_{0.15}$Y$_{0.10}$Fe$_{0.05}$O$_{1.925}$ Solid Solution The same as for Example 1 using 150 g of ZrO(O$_3$)$_2$ solution (21 wt % Zr), 32.01 g Ce(NO$_3$)$_3$.6H$_2$O, 18.88 g Y(NO$_3$)$_3$.6H$_2$O and 9.96 g Fe(NO$_3$)$_3$.9H$_2$O. XRD analysis showed that the resultant solid solution had a cubic fluorite structure.

Example 13

Preparation of the Zr$_{0.65}$Ce$_{0.20}$Y$_{0.10}$Fe$_{0.05}$O$_{1.925}$ Solid Solution The same as for Example 1 using 150 g of ZrO(NO$_3$)$_2$ solution (21 wt % Zr), 45.96 g Ce(NO$_3$)$_3$.6H$_2$O, 20.33 g Y(NO$_3$)$_3$.6H$_2$O and 10.72 g Fe(NO$_3$)$_3$.9H$_2$O. XRD analysis showed that the resultant solid solution had a cubic fluorite structure.

Example 14

Preparation of the Zr$_{0.60}$Ce$_{0.25}$Y$_{0.10}$Fe$_{0.05}$O$_{1.925}$ Solid Solution The same as for Example 1 using 150 g of ZrO(NO$_3$)$_2$ solution (21 wt % Zr), 62.24 g Ce(NO$_3$)$_3$.6H$_2$O, 22.02 g Y(NO$_3$)$_3$.6H$_2$O and 11.62 g Fe(NO$_3$)$_3$.9H$_2$O. XRD analysis showed that the resultant solid solution had a cubic fluorite structure.

Example 15

Preparation of the Zr$_{0.55}$Ce$_{0.30}$Y$_{0.10}$Fe$_{0.05}$O$_{1.925}$ Solid Solution The same as for Example 1 using 150 g of ZrO(NO$_3$)$_2$ solution (21 wt % Zr), 81.48 g Ce(NO$_3$)$_3$.6H$_2$O, 24.02 g Y(NO$_3$)$_3$.6H$_2$O and 12.67 g Fe(NO$_3$)$_3$.9H$_2$O. XRD analysis showed that the resultant solid solution had a cubic fluorite structure.

Example 16

Preparation of the Zr$_{0.50}$Ce$_{0.35}$Y$_{0.10}$Fe$_{0.05}$O$_{1.925}$ Solid Solution The same as for Example 1 using 150 g of ZrO(NO$_3$)$_2$ solution (21 wt % Zr), 104.57 g Ce(NO$_3$)$_3$.6H$_2$O, 26.43 g Y(NO$_3$)$_3$.6H$_2$O and 13.94 g Fe(NO$_3$)$_3$.9H$_2$O. XRD analysis showed that the resultant solid solution had a cubic fluorite structure.

Example 17

Preparation of the Zr$_{0.45}$Ce$_{0.40}$Y$_{0.10}$Fe$_{0.05}$O$_{1.925}$ Solid Solution The same as for Example 1 using 150 g of ZrO(NO$_3$)$_2$ solution (21 wt % Zr), 132.79 g Ce(NO$_3$)$_3$.6H$_2$O, 29.36 g Y(NO3)3.6H20 and 15.49 g Fe(NO$_3$)$_3$.9H$_2$O. XRD analysis showed that the resultant solid solution had a cubic fluorite structure.

Example 18

Preparation of the Zr$_{0.40}$Ce$_{0.45}$Y$_{0.10}$Fe$_{0.05}$O$_{1.925}$ Solid Solution The same as for Example 1 using 150 g of ZrO(NO$_3$)$_2$ solution (21 wt % Zr), 168.06 g Ce(NO$_3$)$_3$.6H$_2$O, 33.03 g Y(NO$_3$)$_3$.6H$_2$O and 17.42 g Fe(NO$_3$)$_3$.9H$_2$O. XRD analysis showed that the resultant solid solution had a cubic fluorite structure.

Example 19

Preparation of the Zr$_{0.35}$Ce$_{0.50}$Y$_{0.10}$Fe$_{0.05}$O$_{1.925}$ Solid Solution The same as for Example 1 using 150 g of ZrO(NO$_3$)$_2$ solution (21 wt % Zr), 213.41 g Ce(NO$_3$)$_3$.6H$_2$O, 37.75 g Y(NO$_3$)$_3$.6H$_2$O and 19.91 g Fe(NO$_3$)$_3$.9H$_2$O. XRD analysis showed that the resultant solid solution had a cubic fluorite structure.

Example 20

Preparation of the Zr$_{0.50}$Ce$_{0.37}$Y$_{0.09}$Fe$_{0.03}$O$_{1.955}$ Solid Solution The same as for Example 1 using 150 g of ZrO(NO$_3$)$_2$ solution (21 wt % Zr), 110.54 g Ce(NO$_3$)$_3$.6H$_2$O, 26.83 g La(NO$_3$)$_3$.6H$_2$O and 8.98 g Pr(NO$_3$)$_3$.6H$_2$O. XRD analysis showed that the resultant solid solution had a cubic fluorite structure.

Example 21

Preparation of the Zr$_{0.50}$Ce$_{0.35}$Y$_{0.12}$Cu$_{0.03}$O$_{1.91}$ Solid Solution The same as for Example 1 using 150 g of ZrO(NO$_3$)$_2$ solution (21 wt % Zr), 104.57 g Ce(NO$_3$)$_3$.6H$_2$O, 31.71 g Y(NO$_3$)$_3$.6H$_2$O and 6.12 g Cu(NO$_3$)$_3$.6H$_2$O. XRD analysis showed that the resultant solid solution had a cubic fluorite structure.

Example 22

Preparation of the Zr$_{0.44}$Ce$_{0.35}$Y$_{0.15}$Ni$_{0.06}$O$_{1.865}$ Solid Solution The same as for Example 1 using 150 g of ZrO(NO$_3$)$_2$ solution (21 wt % Zr), 118.83 g Ce(NO$_3$)$_3$.6H$_2$O, 45.05 g Y(NO$_3$)$_3$.6H$_2$O and 13.68 g Ni(NO$_3$)$_3$.6H$_2$O. XRD analysis showed that the resultant solid solution had a cubic fluorite structure.

Example 23

Preparation of the Zr$_{0.44}$Ce$_{0.35}$Y$_{0.15}$Fe$_{0.06}$O$_{1.895}$ Solid Solution The same as for Example 1 using 150 g of ZrO(NO$_3$)$_2$ solution (21 wt % Zr), 118.83 g Ce(NO$_3$)$_3$.6H$_2$O, 45.05 g $Y(NO_3)_3 \cdot 6H_2O$ and 19.01 g $Fe(NO_3)_3 \cdot 6H_2O$. D analysis showed that the resultant solid solution had a cubic fluorite structure.

Example 24

Preparation of the $Zr_{0.56}Ce_{0.30}Y_{0.04}Fe_{0.10}O_{1.93}$ Oxide Product The same as for Example 1 using 150 g of $ZrO(NO_3)_2$ solution (21 wt % Zr), 80.26 g $Ce(NO_3)_3 \cdot 6H_2O$, 9.47 g $Y(NO_3)_3 \cdot 6H_2O$ and 24.96 g $Fe(NO_{33} \cdot 9H_2O$. XRD analysis showed that the resultant oxide product is a mixture of different phases, including $Fe_2O_3$ (hematite).

Example 25

Preparation of the $Zr_{0.45}Ce_{0.35}La_{0.10}Fe_{0.10}O_{1.90}$ Oxide Product The same as for Example 1 using 150 g of $ZrO(NO_3)_2$ solution (21 wt % Zr), 116.53 g $Ce(NO_3)_3 \cdot 6H_2O$, 33.29 g $La(NO_3)_3 \cdot 6H_2O$ and 31.09 g $Fe(NO_3)_3 \cdot 9H_2O$. XRD analysis showed that the resultant oxide product is a mixture of different phases, including $Fe_2O_3$ (hematite).

Example 26

Performance Evaluation of the Solid Solution of Example 1 Compared to Reference Material Without Fe Present.

The performance of the solid solution of Example 1 as an OIC/OS component in a TWC catalyst was measured by the preparation of a Pd, Rh TWC test catalyst (Catalyst A) and subsequent comparison to a state-of-the-art reference catalyst, Catalyst B. The reference Catalyst B contained very similar loadings of Zr, Ce, La and Pr as the test catalyst A. The compositions of the two catalysts are summarized in Table 2.

TABLE 2

| Catalyst | Solid Solution Composition Mole % | | | | PM Loading (g/ft³) | | Solid Solution Loading (g/in³)[1] | Ce Loading g/ft³ (OSC)[1] |
| --- | --- | --- | --- | --- | --- | --- | --- | --- |
| | Ce | Zr | Fe | La + Pr | Pd | Rh | | |
| A | 35 | 52 | 1.0 | 13 | 80 | 10 | 1.2 | 690 |
| B | 37 | 50 | | 14 | 80 | 10 | 1.2 | 740 |

[1]In the palladium layer of the catalyst.

Catalyst preparation, aging and stand dynamometer testing were carried out as previously described in Examples 13, 14 and 15 of U.S. Pat. No. 5,064,803 (which is incorporated herein by reference). However, in the current catalyst preparations, dual layer catalysts were made with Pd in the under layer and Rh in the top layer. Further, the precious metals (PM) were not post impregnated as described in U.S. Pat. No. 5,064,803 but were added to the Pd and Rh washcoat slurries before milling. For both catalysts the Rh layer was identical and contained a Zr-rich OSC function optimized for Rh. The only difference between the Test Catalyst A and Reference Catalyst B was the OIC/OS component of the Pd layer where the new solid solution containing Fe was used for Catalyst A and a very similar composition but without Fe was used in the Pd layer of Catalysts B. The washcoats were coated onto ceramic honeycomb substrates of 4 inches (in) round by 6 inches (in) long, volume was 75 in³ or 1.2 liters, cell density of 400 cells/in² and wall thickness of 6.5 mil.

In the current case, a more severe aging was carried out than described in U.S. Pat. No. 5,064,803, where the maximum bed temperature was 1,050° C. for 25% of the aging time. The aging time was for 125 hours and after aging the catalysts were evaluated on a stand dynamometer for light-off and steady state activity as described in detail in U.S. Pat. No. 5,064,803.

After stand dynamometer testing, the catalysts were evaluated on a vehicle using the standard North American Federal Test Procedure (FTP) driving cycle and the cumulative tail pipe emissions were measured. The vehicle used was a 3.1 L Chevy Lumina with 1998 EMS calibration, The catalysts were located in the underbody position where the catalyst inlet temperatures varied from 350° C. to 450° C. over the driving cycle. This low catalyst inlet operating temperature for this particular vehicle stresses the low temperature OSC characteristics of the catalysts and represents a sensitive measure of both the facile nature of the OIC/OS properties of the catalysts as well as the low temperature oxygen storage capacity characteristics of the two catalysts evaluated.

The results are summarized in Table 3.

TABLE 3

| Testing Conditions | T = 400° C.; GHSV* = 30,000 A/F Amplitude = ±0.65 | | T = 482° C.; GHSV* = 42,000 A/F Amplitude = ±0.8 | |
| --- | --- | --- | --- | --- |
| Test Point/ Component | Catalyst A % Conversion | Catalyst B % Conversion | Catalyst A % Conversion | Catalyst B % Conversion |
| Integral Stoich. | | | | |
| HC | 96 | 89 | 98 | 92 |
| CO | 88 | 78 | 89 | 80 |
| $NO_x$ | 87 | 79 | 90 | 84 |
| Stoich. A/F = 14.56 | | | | |
| HC | 96 | 89 | 98 | 92 |
| CO | 93 | 80 | 96 | 84 |
| $NO_x$ | 92 | 81 | 95 | 86 |
| Rich A/F = 14.25 | | | | |
| HC | 80 | 72 | 90 | 86 |
| CO | 37 | 39 | 30 | 38 |
| $NO_x$ | 99 | 95 | 96 | 96 |
| Light-Off $T_{50\% }$ Conv. | | | | |
| HC | 363 | 378 | | |
| CO | 367 | 374 | | |
| $NO_x$ | 355 | 368 | | |

*GHSV — gas hourly space velocity.

From table 3 it is evident that the Test Catalyst A shows higher performance for HC, CO and NOx conversion as compared to the Reference Catalyst B.

The FTP performance results are summarized in Table 4 for the cold start, cold stabilized, hot start phases of the FTP test and finally for the weighted total tail pipe emissions. Note: the results for the three separate phases of the FTP were not adjusted using the standard weighting factors. Also reported are the engine out emissions in grams per mile (g/mile) and percent conversions (% Conv.)for the individual tests so as to give a more accurate comparison of the two catalysts.

TABLE 4

|  | Test Catalyst A | Ref. Catalyst B |
|---|---|---|
| Engine Out (Total) g/mile | | |
| THC[1] | 2.65 | 2.73 |
| NMHC[2] | 2.585 | 2.664 |
| CO | 12.10 | 12.46 |
| $NO_x$ | 2.30 | 2.23 |
| Tail Pipe g/mile (% Conv.) Cold Start | | |
| THC[1] | 0.598 (77.6) | 0.884 (67.7) |
| NMHC[2] | 0.559 (78.5) | 0.834 (68.7) |
| CO | 7.02 (57.2) | 8.49 (49.3) |
| $NO_x$ | 0.529 (82.1) | 0.893 (67.4) |
| Tail Pipe g/mile (% Conv.) Cold Stabilized | | |
| THC[1] | 0.028 (99.0) | 0.159 (94.7) |
| NMHC[2] | 0.013 (99.5) | 0.131 (95.5) |
| CO | 0.03 (99.7) | 0.46 (96.1) |
| $NO_x$ | 0.037 (97.9) | 0.218 (87.6) |
| Tail Pipe g/mile (% Conv.) Hot Start | | |
| THC[1] | 0.114 (94.6) | 0.306 (86.1) |
| NMHC[2] | 0.089 (95.8) | 0.274 (87.2) |
| CO | 0.76 (92.5) | 1.79 (82.8) |
| $NO_x$ | 0.167 (93.9) | 0.54 (80.0) |
| Total Tail Pipe g/mile (% Conv.) (Weighted) | | |
| THC[1] | 0.170 (93.6) | 0.349 (87.2) |
| NMHC[2] | 0.147 (94.3) | 0.315 (88.2) |
| CO | 1.68 (86.1) | 2.48 (80.1) |
| $NO_x$ | 0.175 (92.4) | 0.446 (80.0) |

THC[1] = Total Hydrocarbon
NMHC[2] = Non-methane Hydrocarbon

It is apparent that the Test Catalyst A has significantly lower total tail pipe emissions and gives higher conversions for HC, CO and $NO_x$ over the three phases of the FTP test. For example, at cold start, Catalyst A had greater than about 75% conversion of THC and NMHC, greater than about 80% conversion of $NO_x$, and greater than about 55% of CO; at cold stabilized, all conversions exceeded about 95%, even about 97%, with the conversions for THC, NMHC, and CO exceeding about 99%; and at hot start conversions exceeded about 90%, with about 94% or greater achieved for THC, NMHC, and $NO_x$. Finally, the weighted results for total tail pipe emissions exceeded about 85% for all four compounds, with greater than about 90% for THC, NMHC and $NO_x$, and nearly about 94% for THC and NMHC.

Figure 14:
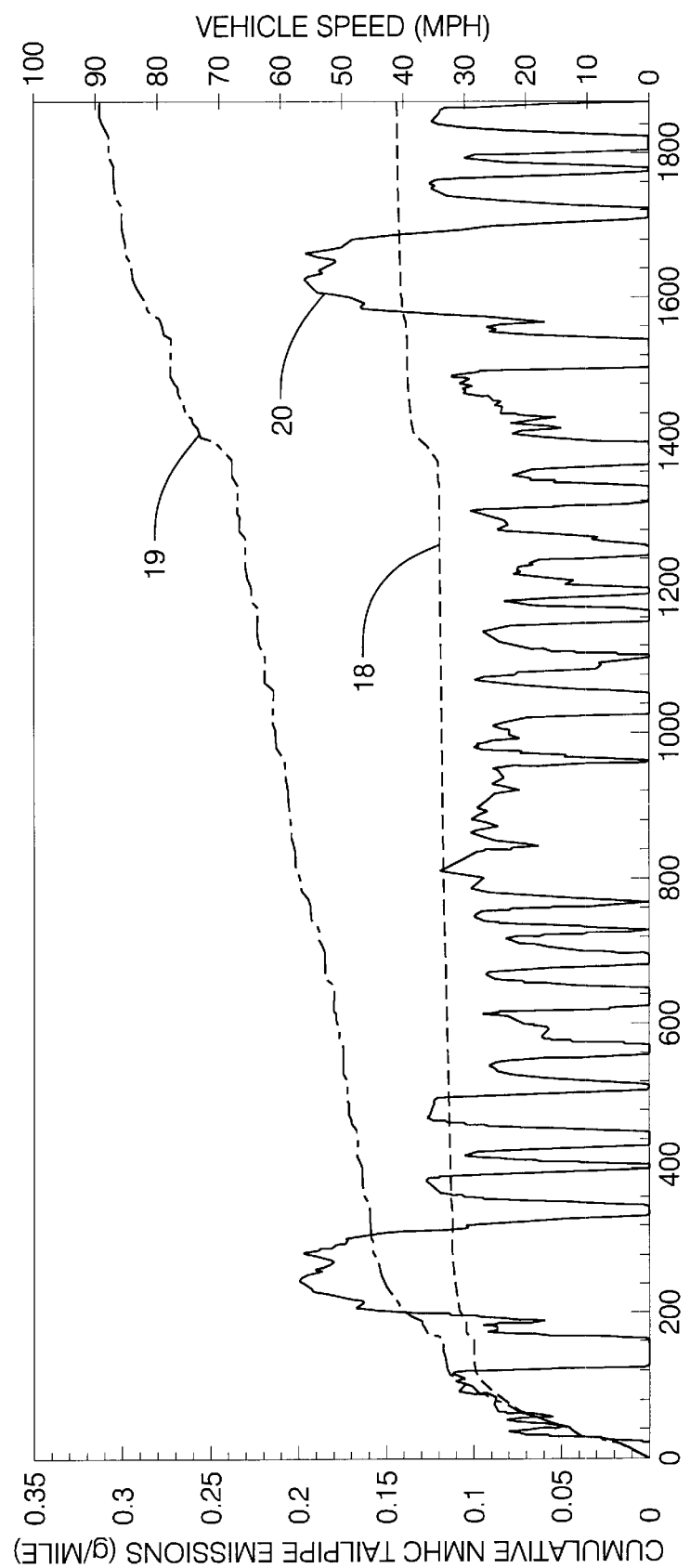
FIG. 14 is a comparison of the cumulative tail pipe emissions for NMHC for Test Catalyst A and Reference Catalyst B showing significantly lower emissions for the Test Catalyst A. Test Method=FTP; Vehicle=V-6, 3.1L Chevy Lumina with 1998 EMS calibration.
Figure 15:
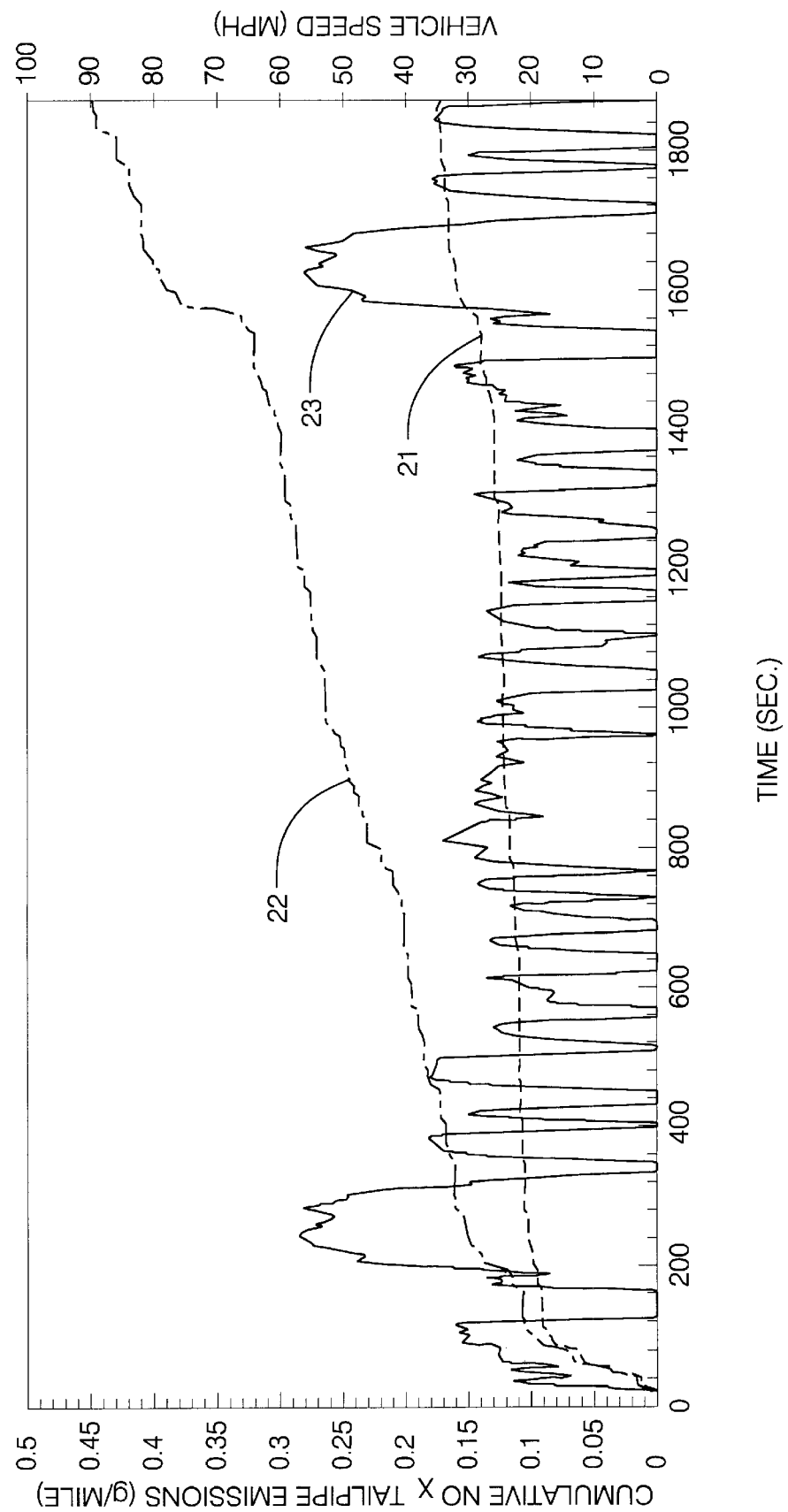
FIG. 15 is a comparison of the cumulative tail pipe emissions for $NO_x$ for Test Catalyst A and Reference Catalyst B showing significantly lower emissions for Test Catalyst A. Test Method=FTP; Vehicle=V-6, 3.1L Chevy Lumina with 1998 EMS calibration.
Figure 16:
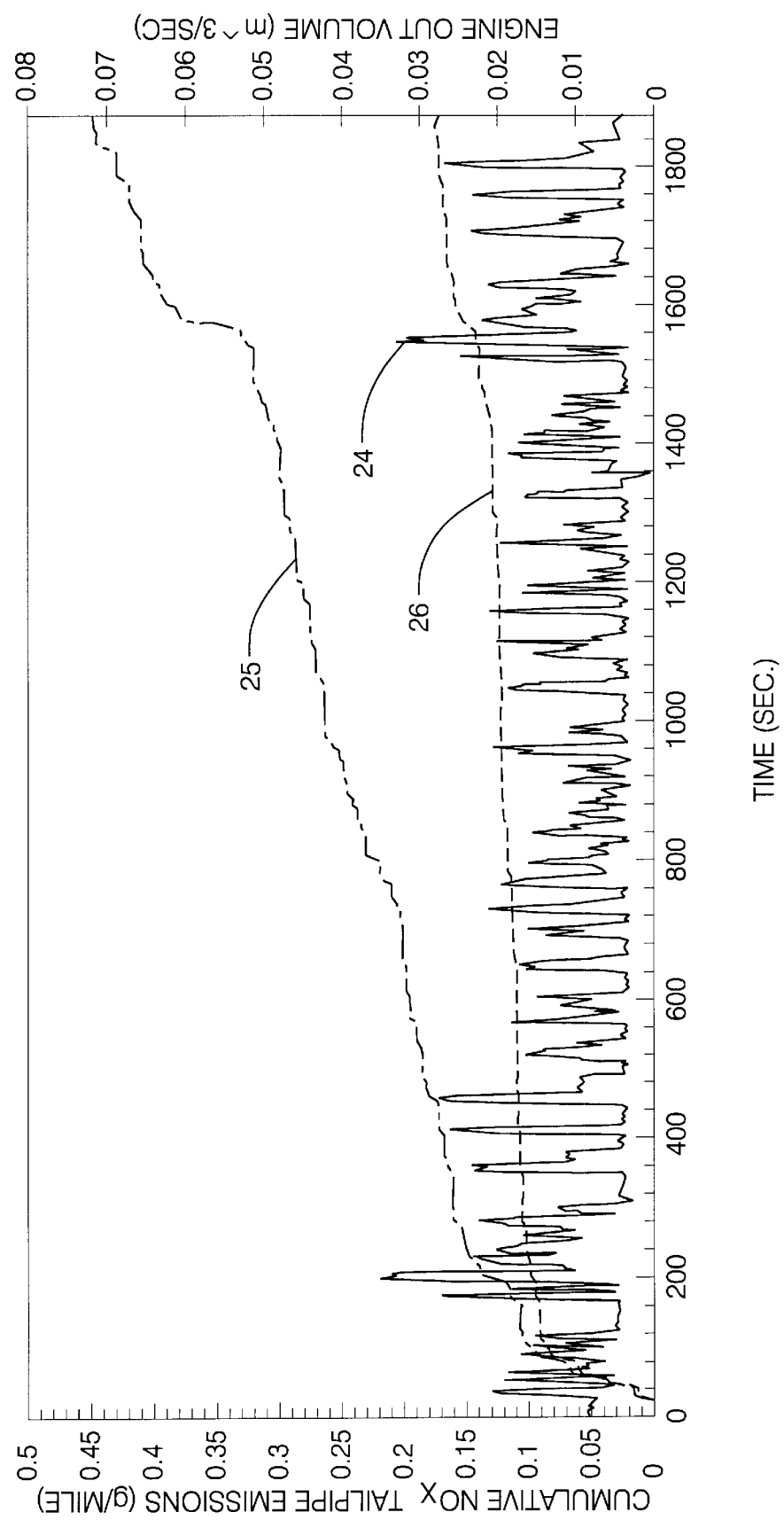
FIG. 16 is a comparison of the impact of engine out exhaust gas flow rate on NOx emissions over the FTP cycle showing that the Test Catalysts A is more effective in preventing $NO_x$ breakthrough.

The cumulative emissions for the two catalysts were further summarized and compared in FIGS. 14, 15 and 16. In FIGS. 14 and 15 are shown the cumulative tail pipe emissions as a function of time for NMHC and NOx respectively (Test Catalyst A is represented by lines 18, 21, and 24, while Test Catalyst B is represented by lines 19, 22, and 25). Also plotted is the vehicle speed as a function of time. (FIG. 15, line 23) It is observed that emission breakthrough primarily occurs during accelerations. This is further demonstrated in FIGS. 14 and 16 where the engine out flow rate and cumulative emissions are plotted together (lines 20 and 26, respectively). The accelerations are now observed as sharp changes or spikes in flow rate, with emission break through occurring during these operating conditions. This arises as the catalysts experience sudden switches to high flow conditions during accelerations. During the switch to high flow conditions proper control of A/F at stoichiometry is difficult to maintain and this contributes significantly to poor performance. The data demonstrates that the new OIC/OS component of test Catalyst A is more effective in handling these extremes in catalyst operation.

Due to the enhanced phase stability and oxygen ion conducting properties of these OIC/OS materials, they can be employed in numerous applications, including: in solid oxide fuel cells (SOFC) for energy conversion, in electrochemical oxygen sensors, in oxygen ion pumps, structural ceramics of high toughness, in heating elements, in electrochemical reactors, in steam electrolysis cells, in electrochromic materials, in magnetohydrodynamic (MHD) generators, in hydrogen sensors, in catalysts for methanol decomposition, as potential hosts for immobilizing nuclear waste, as oxygen storage materials in three-way-conversion (TWC) catalysts, as well as in other applications where oxygen storage capacity and/or oxygen ion conductivity are factors.

When used as oxygen storage materials in three-way-conversion catalysts, for example, the OIC/OS material would be supported on a substrate as part of the three-way-conversion catalyst (e.g., noble metals, such as platinum, palladium, iridium, osmium, rhodium, ruthenium, as well as combinations and alloys comprising at least one of these noble metals, and a high surface area porous support such as a high surface area alumina, as well as other metals and metal oxides, and combinations and alloys comprising at least one of the foregoing). It is believed that, when exposed to an exhaust environment, this combined material would exhibit substantially equal or increased three-way-conversion capabilities compared to a conventional catalyst having a higher catalyst (e.g., metal) loading, and substantially equal capabilities compared to a conventional catalyst having a higher cerium content.

For example, when used in an exhaust system for converting hydrocarbons, carbon monoxide and nitrogen oxides in an exhaust stream, using a catalyst comprising an OIC/OS material having up to about 95 mole percent (mole %) zirconium, Lip to about 50 mole % cerium, up to about 20 mole % of a metal selected from the group consisting of yttrium, rare earths (La, Pr and La+Pr) and a mixture of yttrium and a rare earth; and about 0.05 to about 25 mole % of a base metal selected from the group consisting of iron, copper, cobalt, nickel, silver, manganese, bismuth and mixtures comprising at least one of the foregoing metals, a noble metal component, and a high surface area porous support, wherein the zirconium, cerium, metal, base metal, noble metal and high surface area porous support are deposited on a substrate;

exposing the exhaust stream to the catalyst; and converting hydrocarbons, carbon monoxide and nitrogen oxides in the exhaust stream to nitrogen.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

We claim:

1. An OIC/OS material, based upon 100 mole % of the material, comprising:

up to about 95 mole % zirconium;

up to about 50 mole % cerium;

up to about 20 mole % of a stabilizer selected from the group consisting of yttrium, rare earths, and combinations comprising at least one of the stabilizers; and about 0.01 to about 25 mole % of a base metal selected from the group consisting of iron, copper, cobalt, nickel, silver, manganese, bismuth and mixtures comprising at least one of the foregoing metals.

2. An OIC/OS material as in claim 1, further comprising up to about 90 mole % zirconium; up to about 40 mole % cerium; about 2 to about 15 mole % of the stabilizer, and about 0.01 to about 15 mole % of the base metal.

3. An OIC/OS material as in claim 1, further comprising about 50 to about 85 mole % zirconium; about 10 to about 35 mole % cerium; about 5 to about 15 mole % of the stabilizer; and about 0.001 to about 10 mole % of the base metal.

4. An OIC/OS material as in claim 1, wherein, after aging for greater than about 36 hours at temperatures up to about 1,200° C., greater than about 60 to about 95 mole % of the cerium is reducible.

5. An OIC/OS material as in claim 4, wherein, about 70 mole % to about 95 mole % of the cerium is reducible.

6. An OIC/OS material as in claim 5, wherein, about 80 mole % to about 95 mole % of the cerium is reducible.

7. An OIC/OS material as in claim 4, wherein the cerium is reducible at a temperature below about 700° C.

8. An OIC/OS material as in claim 1, wherein at least about 95% of the OIC/OS material maintains a cubic fluorite crystal structure under oxidizing conditions up to 1,200° C. and/or reducing conditions up to 1,000° C.

9. An OIC/OS material as in claim 8, wherein the base metals which reduced under reducing conditions, incorporate back into the crystal structure under oxidizing conditions.

10. An OIC/OS material, based upon 100 mole % material, comprising the reaction product of:

up to about 95 mole % zirconium;

up to about 50 mole % cerium;

up to about 20 mole % of a stabilizer selected from the group consisting of yttrium, rare earths, and combinations comprising at least one of the stabilizers; and about 0.01 to about 25 mole % of a base metal selected from the group consisting of iron, copper, cobalt, nickel, silver, manganese, bismuth and mixtures comprising at least one of the foregoing metals.

11. A catalyst, comprising:

an OIC/OS material having up to about 95 mole % zirconium, up to about 50 mole % cerium, up to about 20 mole % of a stabilizer selected from the group consisting of yttrium, rare earths, and combinations comprising at least one of the stabilizers, based upon 100 mole % of the material; and about 0.01 to about 25 mole % of a base metal selected from the group consisting of iron, copper, cobalt, nickel, silver, manganese, bismuth and mixtures comprising at least one of the foregoing metals;

a noble metal; and a porous support;

wherein the zirconium, cerium, metal, base metal, noble metal and porous support are deposited on a substrate.

12. A catalyst as in claim 11, further comprising up to about 90 mole % zirconium; up to about 40 mole % cerium; about 2 to about 15 mole % of the stabilizer; and about 0.01 to about 15 mole % of the base metal.

13. A catalyst as in claim 12, further comprising about 50 to about 85 mole % zirconium; about 10 to about 40 mole % cerium; about 5 to about 15 mole % of the stabilizer; and about 0.01 to about 10 mole % of the base metal.

14. A catalyst as in claim 11, wherein, after aging for greater than about 36 hours at temperatures up to about 1,200° C., about 60 to about 95 mole % of the cerium present in the solid solution is reducible.

15. A method for converting hydrocarbons, carbon monoxide and nitrogen oxides in an exhaust stream, comprising:

using a catalyst comprising an OIC/OS material having up to about 95 mole % zirconium, up to about 50 mole % cerium, up to about 20 mole % of a stabilizer selected from the group consisting of yttrium, rare earths, and combinations comprising at least one of the stabilizers; and about 0.01 to about 25 mole % of a base metal selected from the group consisting of iron, copper, cobalt, nickel, silver, manganese, bismuth and mixtures comprising at least one of the foregoing metals, based upon 100 mole % of the material, a noble metal component, and a porous support, wherein the zirconium, cerium, metal, base metal, noble metal and porous support are deposited on a substrate;

exposing the exhaust stream to the catalyst; and converting hydrocarbons, carbon monoxide and nitrogen oxides in the exhaust stream to nitrogen, water and carbon dioxide.

\* \* \* \* \*